US00RE48215E

(19) United States
(12) Reissued Patent
Neiley

(10) Patent Number: US RE48,215 E
(45) Date of Reissued Patent: Sep. 22, 2020

(54) LACE FIXATION ASSEMBLY AND SYSTEM

(71) Applicant: Boa Technology Inc., Denver, CO (US)

(72) Inventor: Roger T. Neiley, Laguna Beach, CA (US)

(73) Assignee: BOA Technology Inc., Denver, CO (US)

(21) Appl. No.: 16/130,943

(22) Filed: Sep. 13, 2018

Related U.S. Patent Documents

Reissue of:
(64) Patent No.: 9,439,477
Issued: Sep. 13, 2016
Appl. No.: 14/166,799
Filed: Jan. 28, 2014

U.S. Applications:
(60) Provisional application No. 61/757,692, filed on Jan. 28, 2013.

(51) Int. Cl.
*A43C 1/06* (2006.01)
*A43C 7/00* (2006.01)

(52) U.S. Cl.
CPC ..... *A43C 7/00* (2013.01); *Y10T 24/2183* (2015.01); *Y10T 24/3703* (2015.01); *Y10T 24/3724* (2015.01)

(58) Field of Classification Search
CPC ..... Y10T 24/2183; Y10T 24/3703; Y10T 24/3724
USPC ..... 24/713.2, 714.8, 712.9, 68 SK, 69 SK
See application file for complete search history.

(56) References Cited

U.S. PATENT DOCUMENTS 59,332 A 10/1866 White et al.
80,834 A 8/1868 Prussia
117,530 A 8/1871 Foote
228,946 A 6/1880 Schulz
230,759 A 8/1880 Drummond
(Continued)

FOREIGN PATENT DOCUMENTS

AT 127075 2/1932
AT 244804 1/1966
(Continued)

OTHER PUBLICATIONS

International Search Report and Written Opinion mailed May 19, 2014 for International Patent Application No. PCT/US2014/013458 filed Jan. 28, 2014, all pages.

(Continued)

*Primary Examiner* — Beverly M Flanagan
(74) *Attorney, Agent, or Firm* — Kilpatrick Townsend & Stockton LLP

(57) ABSTRACT

A lace closure system may include a low friction guide that defines the turning radius and direction of a lace which, though tension, pulls two or more panels toward each other. The lace closure system may include a fixator that defines a slot into which the lace is led, containing multiple engagement surfaces that, when the lace is wrapped into the slot, serve to engage the lace preventing unwanted loosening. The lace closure system may include a ring onto which the lace is attached, to assist in applying manual tension to the lace. The ring may be shaped and sized to removably attach to an outer perimeter of the fixator after excess lace has been wrapped into the slot.

15 Claims, 32 Drawing Sheets

(56) References Cited

U.S. PATENT DOCUMENTS 379,113 A 3/1888 Hibberd
746,563 A 12/1903 McMahon
819,993 A 5/1906 Haws et al.
908,704 A 1/1909 Sprinkle
1,170,472 A 2/1916 Barber
1,288,859 A 12/1918 Feller et al.
1,390,991 A 9/1921 Fotchuk
1,393,188 A 10/1921 Whiteman
1,412,486 A 4/1922 Paine
1,416,203 A 5/1922 Hobson
1,429,657 A 9/1922 Trawinski
1,466,673 A 9/1923 Solomon et al.
1,469,661 A 10/1923 Tosuke
1,481,903 A 1/1924 Hart
1,502,919 A 7/1924 Seib
1,530,713 A 3/1925 Clark
1,530,047 A 6/1932 Boulet et al.
1,995,243 A 3/1935 Clarke
2,088,851 A 8/1937 Gantenbein
2,109,751 A 3/1938 Matthias et al.
2,124,310 A 7/1938 Murr, Jr.
2,316,102 A 4/1943 Preston
2,539,026 A 1/1951 Mangold
2,611,940 A 9/1952 Cairns
2,636,237 A 4/1953 Price
2,673,381 A 3/1954 Dueker
2,907,086 A 10/1959 Ord
2,991,523 A 7/1961 Del Conte
3,028,602 A 4/1962 Miller
3,035,319 A 5/1962 Wolff
3,106,003 A 10/1963 Herdman
3,112,545 A 12/1963 Williams
3,122,810 A 3/1964 Lawrence et al.
3,163,900 A 1/1965 Martin
D200,394 S 2/1965 Hakim
3,169,325 A 2/1965 Fesl
3,193,950 A 7/1965 Liou
3,197,155 A 7/1965 Chow
3,221,384 A 12/1965 Aufenacker
3,276,090 A 10/1966 Nigon
D206,146 S 11/1966 Hendershot
3,345,707 A 10/1967 Rita
D210,649 S 4/1968 Getgay
3,401,437 A 9/1968 Christpohersen
3,430,303 A 3/1969 Perrin et al.
3,491,465 A 1/1970 Martin
3,545,106 A 12/1970 Martin
3,618,232 A 11/1971 Shnuriwsky
3,668,791 A 6/1972 Salzman et al.
3,678,539 A 7/1972 Graup
3,703,775 A 11/1972 Gatti
3,729,779 A 5/1973 Porth
3,738,027 A 6/1973 Schoch
3,793,749 A 2/1974 Gertsch et al.
3,808,644 A 5/1974 Schoch
3,934,346 A 1/1976 Sasaki et al.
3,975,838 A 8/1976 Martin
4,084,267 A 4/1978 Zadina
4,130,949 A 12/1978 Seidel
4,142,307 A 3/1979 Martin
4,227,322 A 10/1980 Annovi
4,261,081 A 4/1981 Lott
4,267,622 A 5/1981 Burnett-Johnston
4,408,403 A 10/1983 Martin
4,417,703 A 11/1983 Weinhold
4,433,456 A 2/1984 Baggio
4,463,761 A 8/1984 Pols et al.
4,480,395 A 11/1984 Schoch
4,507,878 A 4/1985 Semouha
4,516,576 A 5/1985 Kirchner
4,551,932 A 11/1985 Schoch
4,555,830 A 12/1985 Petrini et al.
4,574,500 A 3/1986 Aldinio et al.
4,616,432 A 10/1986 Bunch et al.
4,616,524 A 10/1986 Bidoia
4,619,057 A 10/1986 Sartor et al.
4,620,378 A 11/1986 Sartor
4,631,839 A 12/1986 Bonetti et al.
4,631,840 A 12/1986 Gamm
4,633,599 A 1/1987 Morell et al.
4,644,938 A 2/1987 Yates et al.
4,654,985 A 4/1987 Chalmers
4,660,300 A 4/1987 Morell et al.
4,660,302 A 4/1987 Arieh et al.
4,680,878 A 7/1987 Pozzobon et al.
4,719,670 A 1/1988 Kurt
4,719,709 A 1/1988 Vaccari
4,719,710 A 1/1988 Pozzobon
4,722,477 A 2/1988 Floyd
4,741,115 A 5/1988 Pozzobon
4,748,726 A 6/1988 Schoch
4,760,653 A 8/1988 Baggio
4,780,969 A 11/1988 White, Jr.
4,787,124 A 11/1988 Pozzobon et al.
4,790,081 A 12/1988 Benoit et al.
4,796,829 A 1/1989 Pozzobon et al.
4,799,297 A 1/1989 Baggio et al.
4,802,291 A 2/1989 Sartor
4,811,503 A 3/1989 Iwama
4,826,098 A 5/1989 Pozzobon et al.
4,841,649 A 6/1989 Baggio et al.
4,856,207 A 8/1989 Datson
4,862,878 A 9/1989 Davison
4,870,723 A 10/1989 Pozzobon et al.
4,870,761 A 10/1989 Tracy
4,884,760 A 12/1989 Baggio et al.
4,901,938 A 2/1990 Cantley et al.
4,924,605 A 5/1990 Spademan
D308,282 S 6/1990 Bergman et al.
4,937,953 A 7/1990 Walkhoff
4,961,544 A 10/1990 Bidoia
4,979,953 A 12/1990 Spence
4,989,805 A 2/1991 Burke
5,001,817 A 3/1991 De Bortoli et al.
5,016,327 A 5/1991 Klausner
5,042,177 A 8/1991 Schoch
5,062,225 A 11/1991 Gorza
5,065,480 A 11/1991 DeBortoli
5,065,481 A 11/1991 Walkhoff
5,108,216 A 4/1992 Geyer et al.
5,117,567 A 6/1992 Berger
5,152,038 A 10/1992 Schoch
5,157,813 A 10/1992 Carroll
5,158,428 A 10/1992 Gessner et al.
5,177,882 A 1/1993 Berger
5,181,331 A 1/1993 Berger
5,184,378 A 2/1993 Batra
D333,552 S 3/1993 Berger et al.
5,205,055 A 4/1993 Harrell
5,233,767 A 8/1993 Kramer
5,249,377 A 10/1993 Walkhoff
5,259,094 A 11/1993 Zepeda
5,315,741 A 5/1994 Dubberke
5,319,868 A 6/1994 Hallenbeck
5,319,869 A 6/1994 McDonald et al.
5,325,613 A 7/1994 Sussmann
5,327,662 A 7/1994 Hallenbeck
5,335,401 A 8/1994 Hanson
5,341,583 A 8/1994 Hallenbeck
5,345,697 A 9/1994 Quellais
5,355,596 A 10/1994 Sussmann
5,357,654 A 10/1994 Hsing-Chi
5,371,957 A 12/1994 Gaudio
5,381,609 A 1/1995 Hieblinger
5,392,535 A 2/1995 Van Noy et al.
D357,576 S 4/1995 Steinweis
5,425,161 A 6/1995 Schoch
5,425,185 A 6/1995 Gansler
5,430,960 A 7/1995 Richardson
5,433,648 A 7/1995 Frydman
5,463,822 A 11/1995 Miller
5,477,593 A 12/1995 Leick
D367,755 S 3/1996 Jones
D367,954 S 3/1996 Dion

(56) References Cited

U.S. PATENT DOCUMENTS 5,502,902 A 4/1996 Sussmann
5,511,325 A 4/1996 Hieblinger
5,526,585 A 6/1996 Brown et al.
5,535,531 A 7/1996 Karabed et al.
5,537,763 A 7/1996 Donnadieu et al.
5,557,864 A 9/1996 Marks
5,566,474 A 10/1996 Leick et al.
D375,831 S 11/1996 Perry
5,596,820 A 1/1997 Edauw et al.
5,599,000 A 2/1997 Bennett
5,599,288 A 2/1997 Shirley et al.
5,600,874 A 2/1997 Jungkind
5,606,778 A 3/1997 Jungkind
5,607,448 A 3/1997 Stahl et al.
D379,113 S 5/1997 McDonald et al.
5,638,588 A 6/1997 Jungkind
5,640,785 A 6/1997 Egelja
5,647,104 A 7/1997 James
5,651,198 A 7/1997 Sussmann
5,669,116 A 9/1997 Jungkind
5,692,319 A 12/1997 Parker et al.
5,718,021 A 2/1998 Tatum
5,718,065 A 2/1998 Locker
5,720,084 A 2/1998 Chen
5,732,483 A 3/1998 Cagliari
5,732,648 A 3/1998 Aragon
5,736,696 A 4/1998 Del Rosso
5,737,854 A 4/1998 Sussmann
5,755,044 A 5/1998 Veylupek
5,756,298 A 5/1998 Burczak
5,761,777 A 6/1998 Leick
5,772,146 A 6/1998 Kawamoto et al.
5,784,809 A 7/1998 McDonald
5,791,068 A 8/1998 Bernier et al.
5,819,378 A 10/1998 Doyle
5,833,640 A 11/1998 Vazquez, Jr. et al.
5,839,210 A 11/1998 Bernier et al.
5,845,371 A 12/1998 Chen
5,909,946 A 6/1999 Okajima
D413,197 S 8/1999 Faye
5,934,599 A 8/1999 Hammerslag
5,937,542 A 8/1999 Bourdeau
5,956,823 A 9/1999 Borel
5,971,946 A 10/1999 Quinn et al.
6,015,110 A 1/2000 Lai
6,038,791 A 3/2000 Cornelius et al.
6,052,921 A 4/2000 Oreck
6,070,886 A 6/2000 Cornelius et al.
6,070,887 A 6/2000 Cornelius et al.
6,083,857 A 7/2000 Bottger et al.
6,088,936 A 7/2000 Bahl
6,102,412 A 8/2000 Staffaroni
D430,724 S 9/2000 Matis et al.
6,119,318 A 9/2000 Maurer
6,119,372 A 9/2000 Okajima
6,128,835 A 10/2000 Ritter et al.
6,128,836 A 10/2000 Barret
6,148,489 A 11/2000 Dickie et al.
6,202,953 B1 3/2001 Hammerslag
6,219,891 B1 4/2001 Maurer et al.
6,240,657 B1 6/2001 Weber et al.
6,256,798 B1 7/2001 Egolf et al.
6,267,390 B1 7/2001 Maravetz et al.
6,286,233 B1 9/2001 Gaither
6,289,558 B1 9/2001 Hammerslag
6,311,633 B1 11/2001 Keire
D456,130 S 4/2002 Towns
6,370,743 B2 4/2002 Choe
6,401,364 B1 6/2002 Burt
6,416,074 B1 7/2002 Maravetz et al.
6,467,195 B2 10/2002 Pierre et al.
6,477,793 B1 11/2002 Pruitt et al.
6,502,286 B1 * 1/2003 Dubberke ..... A43C 7/00
24/712.1
6,543,159 B1 4/2003 Carpenter et al.
6,568,103 B2 5/2003 Durocher
6,606,804 B2 8/2003 Kaneko et al.
6,694,643 B1 2/2004 Hsu
6,708,376 B1 3/2004 Landry
6,711,787 B2 3/2004 Jungkind et al.
6,735,829 B2 5/2004 Hsu
6,757,991 B2 7/2004 Sussmann
6,775,928 B2 8/2004 Grande et al.
6,792,702 B2 9/2004 Borsoi et al.
6,802,439 B2 10/2004 Azam et al.
6,823,610 B1 11/2004 Ashley
6,871,812 B1 3/2005 Chang
6,877,256 B2 4/2005 Martin et al.
6,899,720 B1 5/2005 McMillan
6,922,917 B2 8/2005 Kerns et al.
6,938,913 B2 9/2005 Elkington
6,945,543 B2 9/2005 De Bortoli et al.
D510,183 S 10/2005 Tresser
6,976,972 B2 12/2005 Bradshaw
6,993,859 B2 2/2006 Martin et al.
D521,226 S 5/2006 Douglas et al.
7,073,279 B2 7/2006 Min
7,076,843 B2 7/2006 Sakabayashi
7,082,701 B2 8/2006 Dalgaard et al.
7,096,559 B2 8/2006 Johnson et al.
7,134,224 B2 11/2006 Elkington et al.
7,266,911 B2 9/2007 Holzer et al.
7,281,341 B2 10/2007 Reagan et al.
7,293,373 B2 11/2007 Reagan et al.
7,331,126 B2 2/2008 Johnson
7,343,701 B2 3/2008 Pare et al.
7,367,522 B2 5/2008 Chen
7,386,947 B2 6/2008 Martin et al.
7,392,602 B2 7/2008 Reagan et al.
7,401,423 B2 7/2008 Reagan et al.
7,490,458 B2 2/2009 Ford
7,568,298 B2 8/2009 Kerns
7,582,102 B2 9/2009 Heinz et al.
7,584,528 B2 9/2009 Hu
7,591,050 B2 9/2009 Hammerslag
7,597,675 B2 10/2009 Ingimundarson et al.
7,600,660 B2 10/2009 Kasper et al.
7,617,573 B2 11/2009 Chen
7,624,517 B2 12/2009 Smith
7,648,404 B1 1/2010 Martin
7,650,705 B2 1/2010 Donnadieu et al.
7,694,354 B2 4/2010 Philpott et al.
7,752,774 B2 7/2010 Ussher
7,757,412 B2 7/2010 Farys
7,774,956 B2 8/2010 Dua et al.
D626,322 S 11/2010 Servettaz
7,841,106 B2 11/2010 Farys
7,871,334 B2 1/2011 Young et al.
7,877,845 B2 2/2011 Signori
7,900,378 B1 3/2011 Busse
7,908,769 B2 3/2011 Pellegrini
7,947,061 B1 5/2011 Reis
7,950,112 B2 5/2011 Hammerslag et al.
7,954,204 B2 6/2011 Hammerslag et al.
7,963,049 B2 6/2011 Messmer
7,992,261 B2 8/2011 Hammerslag et al.
D646,790 S 10/2011 Castillo et al.
8,056,150 B2 11/2011 Stokes et al.
8,074,379 B2 12/2011 Robinson, Jr. et al.
8,091,182 B2 1/2012 Hammerslag et al.
8,109,015 B2 2/2012 Signori
D663,850 S 7/2012 Joseph
D663,851 S 7/2012 Joseph
8,215,033 B2 7/2012 Carboy et al.
8,231,074 B2 7/2012 Hu et al.
D665,088 S 8/2012 Joseph
8,235,321 B2 8/2012 Chen
8,245,371 B2 8/2012 Chen
8,257,293 B2 9/2012 Ingimundarson et al.
8,266,827 B2 9/2012 Dojan et al.
8,277,401 B2 10/2012 Hammerslag et al.
8,302,329 B2 11/2012 Hurd et al.
8,303,527 B2 11/2012 Joseph
8,308,098 B2 11/2012 Chen

(56) References Cited

U.S. PATENT DOCUMENTS

| | | | |
|---|---|---|---|
| 8,353,087 | B2 | 1/2013 | Chen |
| 8,353,088 | B2 | 1/2013 | Ha |
| D677,045 | S | 3/2013 | Voskuil |
| D679,019 | S | 3/2013 | Siddle et al. |
| 1,060,422 | A1 | 4/2013 | Bowdish |
| 1,062,511 | A1 | 5/2013 | Short |
| 8,434,200 | B2 | 5/2013 | Chen |
| 8,490,299 | B2 | 7/2013 | Dua et al. |
| 8,516,662 | B2 | 8/2013 | Goodman et al. |
| 8,578,632 | B2 | 11/2013 | Bell et al. |
| 1,083,775 | A1 | 1/2014 | Thomas |
| 8,652,164 | B1 | 2/2014 | Aston |
| 1,090,438 | A1 | 3/2014 | Worth et al. |
| 8,713,820 | B2 | 5/2014 | Kerns et al. |
| 8,984,719 | B2 | 3/2015 | Soderberg et al. |
| 9,072,341 | B2 | 7/2015 | Jungkind |
| D735,987 | S | 8/2015 | Hsu |
| 9,101,181 | B2 | 8/2015 | Soderberg et al. |
| 9,125,455 | B2 | 9/2015 | Kerns et al. |
| 9,138,030 | B2 | 9/2015 | Soderberg et al. |
| 2002/0050076 | A1 | 5/2002 | Borsoi et al. |
| 2002/0062579 | A1 | 5/2002 | Caeran |
| 2002/0095750 | A1 | 7/2002 | Hammerslag |
| 2002/0129518 | A1 | 9/2002 | Borsoi et al. |
| 2002/0148142 | A1 | 10/2002 | Oorei et al. |
| 2002/0166260 | A1 | 11/2002 | Borsoi |
| 2002/0178548 | A1 | 12/2002 | Freed |
| 2003/0079376 | A1 | 5/2003 | Oorei et al. |
| 2003/0144620 | A1 | 7/2003 | Sieller |
| 2003/0150135 | A1 | 8/2003 | Liu |
| 2003/0177662 | A1 | 9/2003 | Elkington et al. |
| 2003/0204938 | A1 | 11/2003 | Hammerslag |
| 2004/0041452 | A1 | 3/2004 | Williams |
| 2004/0211039 | A1 | 10/2004 | Livingston |
| 2005/0054962 | A1 | 3/2005 | Bradshaw |
| 2005/0060912 | A1 | 3/2005 | Holzer et al. |
| 2005/0081339 | A1 | 4/2005 | Sakabayashi |
| 2005/0081403 | A1 | 4/2005 | Mathieu |
| 2005/0087115 | A1 | 4/2005 | Martin |
| 2005/0098673 | A1 | 5/2005 | Huang |
| 2005/0102861 | A1 | 5/2005 | Martin |
| 2005/0126043 | A1 | 6/2005 | Reagan et al. |
| 2005/0172463 | A1 | 8/2005 | Rolla |
| 2005/0184186 | A1 | 8/2005 | Tsoi et al. |
| 2005/0198866 | A1 | 9/2005 | Wiper et al. |
| 2006/0135901 | A1 | 6/2006 | Ingimundarson et al. |
| 2006/0156517 | A1 | 7/2006 | Hammerslag et al. |
| 2006/0179685 | A1 | 8/2006 | Borel et al. |
| 2006/0185193 | A1 | 8/2006 | Pellegrini |
| 2006/0287627 | A1 | 12/2006 | Johnson |
| 2007/0006489 | A1 | 1/2007 | Case, Jr. et al. |
| 2007/0063459 | A1 | 3/2007 | Kavarsky |
| 2007/0068040 | A1 | 3/2007 | Farys |
| 2007/0084956 | A1 | 4/2007 | Chen |
| 2007/0113524 | A1 | 5/2007 | Lander |
| 2007/0128959 | A1 | 6/2007 | Cooke |
| 2007/0169378 | A1 | 7/2007 | Sodeberg et al. |
| 2008/0016717 | A1 | 1/2008 | Ruban |
| 2008/0060167 | A1 | 3/2008 | Hammerslag et al. |
| 2008/0060168 | A1 | 3/2008 | Hammerslag et al. |
| 2008/0066272 | A1 | 3/2008 | Hammerslag et al. |
| 2008/0066345 | A1 | 3/2008 | Hammerslag et al. |
| 2008/0066346 | A1 | 3/2008 | Hammerslag et al. |
| 2008/0068204 | A1 | 3/2008 | Carmen et al. |
| 2008/0083135 | A1 | 4/2008 | Hammerslag et al. |
| 2008/0092279 | A1 | 4/2008 | Chiang |
| 2008/0172848 | A1 | 7/2008 | Chen |
| 2008/0196224 | A1 | 8/2008 | Hu ..... A43C 11/16 24/68 SK |
| 2009/0019734 | A1* | 1/2009 | Reagan ..... A43B 3/0031 36/115 |
| 2009/0071041 | A1 | 3/2009 | Hooper |
| 2009/0090029 | A1 | 4/2009 | Kishino |
| 2009/0172928 | A1 | 7/2009 | Messmer et al. |
| 2009/0184189 | A1 | 7/2009 | Soderberg et al. |
| 2009/0272007 | A1 | 11/2009 | Beers et al. |
| 2009/0277043 | A1 | 11/2009 | Graser et al. |
| 2010/0064547 | A1 | 3/2010 | Kaplan |
| 2010/0101061 | A1 | 4/2010 | Ha |
| 2010/0139057 | A1 | 6/2010 | Soderberg et al. |
| 2010/0154254 | A1 | 6/2010 | Fletcher |
| 2010/0175163 | A1 | 7/2010 | Litke |
| 2010/0251524 | A1 | 10/2010 | Chen |
| 2010/0299959 | A1 | 12/2010 | Hammerslag |
| 2010/0319216 | A1 | 12/2010 | Grenzke et al. |
| 2011/0000173 | A1 | 1/2011 | Lander |
| 2011/0071647 | A1 | 3/2011 | Mahon |
| 2011/0162236 | A1 | 7/2011 | Voskuil et al. |
| 2011/0167543 | A1 | 7/2011 | Kovacevich et al. |
| 2011/0191992 | A1 | 8/2011 | Chen |
| 2011/0197362 | A1 | 8/2011 | Chella et al. |
| 2011/0225843 | A1 | 9/2011 | Kerns et al. |
| 2011/0258876 | A1 | 10/2011 | Baker et al. |
| 2011/0266384 | A1 | 11/2011 | Goodman et al. |
| 2012/0000091 | A1 | 1/2012 | Cotterman et al. |
| 2012/0004587 | A1 | 1/2012 | Nickel et al. |
| 2012/0005995 | A1 | 1/2012 | Emery |
| 2012/0023717 | A1 | 2/2012 | Chen |
| 2012/0101417 | A1 | 4/2012 | Joseph |
| 2012/0102783 | A1 | 5/2012 | Swigart et al. |
| 2012/0138882 | A1 | 6/2012 | Moore et al. |
| 2012/0157902 | A1 | 6/2012 | Castillo et al. |
| 2012/0167290 | A1 | 7/2012 | Kovacevich et al. |
| 2012/0174437 | A1 | 7/2012 | Heard |
| 2012/0228419 | A1 | 9/2012 | Chen |
| 2012/0246974 | A1 | 10/2012 | Hammerslag et al. |
| 2012/0310273 | A1 | 12/2012 | Thorpe |
| 2013/0012856 | A1 | 1/2013 | Hammerslag et al. |
| 2013/0014359 | A1 | 1/2013 | Chen |
| 2013/0019501 | A1 | 1/2013 | Gerber |
| 2013/0091667 | A1 | 4/2013 | Zerfas et al. |
| 2013/0092780 | A1 | 4/2013 | Soderberg et al. |
| 2013/0269219 | A1 | 10/2013 | Burns et al. |
| 2013/0277485 | A1 | 10/2013 | Soderberg et al. |
| 2013/0340283 | A1 | 12/2013 | Bell et al. |
| 2013/0345612 | A1 | 12/2013 | Bannister et al. |
| 2014/0082963 | A1 | 3/2014 | Beers |
| 2014/0094728 | A1 | 4/2014 | Soderberg et al. |
| 2014/0117140 | A1 | 5/2014 | Goodman et al. |
| 2014/0123440 | A1 | 5/2014 | Capra et al. |
| 2014/0123449 | A1 | 5/2014 | Soderberg et al. |
| 2014/0208550 | A1 | 7/2014 | Neiley |
| 2014/0221889 | A1 | 8/2014 | Burns et al. |
| 2014/0290016 | A1 | 10/2014 | Lovett et al. |
| 2014/0359981 | A1 | 12/2014 | Cotterman et al. |
| 2015/0007422 | A1 | 1/2015 | Cavanagh et al. |
| 2015/0014463 | A1 | 1/2015 | Converse et al. |
| 2015/0026936 | A1 | 1/2015 | Kerns et al. |
| 2015/0033519 | A1 | 2/2015 | Hammerslag et al. |
| 2015/0059206 | A1 | 3/2015 | Lovett et al. |
| 2015/0076272 | A1 | 3/2015 | Trudel et al. |
| 2015/0089779 | A1 | 4/2015 | Lawrence et al. |
| 2015/0089835 | A1 | 4/2015 | Hammerslag et al. |
| 2015/0101160 | A1 | 4/2015 | Soderberg et al. |
| 2015/0150705 | A1 | 6/2015 | Capra et al. |
| 2015/0151070 | A1 | 6/2015 | Capra et al. |
| 2015/0190262 | A1 | 7/2015 | Capra et al. |
| 2015/0223608 | A1 | 8/2015 | Capra et al. |
| 2015/0237962 | A1 | 8/2015 | Soderberg et al. |
| 2015/0335458 | A1 | 11/2015 | Romo |

FOREIGN PATENT DOCUMENTS

| | | |
|---|---|---|
| AT | 361808 | 4/1981 |
| CA | 2114387 | 1/1994 |
| CA | 2112789 | 8/1994 |
| CH | 41765 | 9/1907 |
| CH | 111341 | 11/1925 |
| CH | 199766 | 11/1938 |
| CH | 204 834 A | 8/1939 |
| CH | 523 669 | 7/1972 |
| CH | 562 015 | 5/1975 |
| CH | 577 282 | 7/1976 |
| CH | 612 076 | 7/1979 |

(56) References Cited

FOREIGN PATENT DOCUMENTS

| | | | |
|---|---|---|---|
| CH | 624 001 | | 7/1981 |
| CN | 2613167 | | 4/2004 |
| CN | 201015448 | | 2/2008 |
| DE | 555211 | | 7/1932 |
| DE | 641976 | | 2/1937 |
| DE | 7043154 | | 11/1970 |
| DE | 1 785 220 | | 5/1971 |
| DE | 2 062 795 | | 6/1972 |
| DE | 23 41 658 | | 3/1974 |
| DE | 24 14 439 | | 10/1975 |
| DE | 29 00 077 | A1 | 7/1980 |
| DE | 2914280 | A1 | 10/1980 |
| DE | 31 01 952 | A1 | 9/1982 |
| DE | 36 26 837 | | 2/1988 |
| DE | 38 13 470 | | 11/1989 |
| DE | 3822113 | C2 | 1/1990 |
| DE | 9413147 | | 6/1994 |
| DE | 43 02 401 | A1 | 8/1994 |
| DE | 43 05 671 | | 9/1994 |
| DE | 9308037 | | 10/1994 |
| DE | 43 24 049 | | 2/1995 |
| DE | 9315776 | | 2/1995 |
| DE | 196 24 553 | | 1/1998 |
| DE | 19700309 | A1 | 7/1998 |
| DE | 19945045 | A1 | 3/2001 |
| DE | 201 16 755 | U1 | 1/2002 |
| DE | 20 2010 000 354 | U1 | 6/2010 |
| DE | 11 2013 005 273 | T5 | 9/2015 |
| EP | 0 056 953 | | 8/1982 |
| EP | 0079874 | A1 | 5/1983 |
| EP | 0 099 504 | | 2/1984 |
| EP | 0 123 050 | | 2/1984 |
| EP | 0 155 596 | | 9/1985 |
| EP | 0 201 051 | | 11/1986 |
| EP | 0 255 869 | | 7/1987 |
| EP | 0 393 380 | | 3/1990 |
| EP | 0 589 232 | | 3/1994 |
| EP | 0 589 233 | A1 | 3/1994 |
| EP | 0 614 625 | A1 | 9/1994 |
| EP | 0 651 954 | A1 | 5/1995 |
| EP | 0 679 346 | | 11/1995 |
| EP | 0 693 260 | B1 | 1/1996 |
| EP | 0 717 942 | | 6/1996 |
| EP | 0 734 662 | A1 | 10/1996 |
| EP | 0 848 917 | | 6/1998 |
| EP | 0 923 965 | | 6/1999 |
| EP | 0 937 467 | | 8/1999 |
| EP | 1163860 | | 12/2001 |
| EP | 1 219 195 | | 7/2002 |
| EP | 1 236 412 | A | 9/2002 |
| EP | 2298107 | B1 | 3/2011 |
| EP | 2359708 | | 8/2011 |
| FR | 1 349 832 | | 3/1963 |
| FR | 1 404 799 | | 7/1965 |
| FR | 2 019 991 | A | 7/1970 |
| FR | 2 108 428 | | 9/1971 |
| FR | 2 175 684 | | 3/1972 |
| FR | 2.108.429 | | 5/1972 |
| FR | 2 565 795 | | 6/1984 |
| FR | 2 598 292 | A1 | 11/1987 |
| FR | 2 726 440 | A1 | 5/1996 |
| FR | 2 770 379 | A1 | 5/1999 |
| FR | 2 814 919 | A1 | 4/2002 |
| GB | 189911673 | | 0/1899 |
| GB | 216400 | | 8/1923 |
| GB | 2 449 722 | A | 12/2008 |
| IT | 1220811 | B | 6/1990 |
| IT | PD 2003 A 000197 | | 4/2003 |
| IT | PD 2003 A 000198 | | 4/2003 |
| JP | 49-28618 | | 3/1974 |
| JP | 51-2776 | | 1/1976 |
| JP | 51-121375 | | 10/1976 |
| JP | 51-131078 | | 10/1976 |
| JP | 53-124987 | | 3/1977 |
| JP | 54-108125 | | 2/1978 |
| JP | 62-57346 | | 4/1987 |
| JP | 63-80736 | | 5/1988 |
| JP | H02-236025 | | 9/1990 |
| JP | 7-000208 | | 6/1995 |
| JP | 6-284906 | | 2/1996 |
| JP | 3031760 | | 9/1996 |
| JP | 3030988 | | 11/1996 |
| JP | 8308608 | | 11/1996 |
| JP | 10-199366 | | 7/1998 |
| JP | 2004-016732 | | 1/2004 |
| JP | 2004-041666 | | 2/2004 |
| JP | 2009-504210 | | 2/2009 |
| KR | 20-0367882 | | 11/2004 |
| KR | 20-0400568 | | 8/2005 |
| KR | 10-0598627 | | 7/2006 |
| KR | 10-0953398 | | 4/2010 |
| KR | 10-1025134 | B1 | 3/2011 |
| KR | 10-1028468 | | 4/2011 |
| KR | 10-1053551 | | 7/2011 |
| WO | WO 94/27456 | | 12/1994 |
| WO | WO 95/03720 | | 2/1995 |
| WO | WO 95/11602 | | 5/1995 |
| WO | WO 98/33408 | | 8/1998 |
| WO | WO 98/37782 | | 9/1998 |
| WO | WO 99/09850 | | 3/1999 |
| WO | WO 99/15043 | | 4/1999 |
| WO | WO 99/43231 | | 9/1999 |
| WO | WO00/53045 | | 9/2000 |
| WO | WO 00/53045 | | 9/2000 |
| WO | WO 00/76337 | A1 | 12/2000 |
| WO | WO 01/08525 | | 2/2001 |
| WO | WO 01/15559 | | 3/2001 |
| WO | WO02/051511 | | 7/2002 |
| WO | WO 2004/093569 | | 11/2004 |
| WO | WO 2005/013748 | A1 | 2/2005 |
| WO | WO 2007/016983 | | 2/2007 |
| WO | WO-2007016983 | A1 * | 2/2007 ..... A43C 11/16 |
| WO | WO 2008/015214 | | 2/2008 |
| WO | WO 2008/033963 | | 3/2008 |
| WO | WO 2009/134858 | | 11/2009 |
| WO | WO 2010/059989 | A2 | 5/2010 |
| WO | WO 2012/165803 | A2 | 12/2012 |
| WO | WO/2015/035885 | | 3/2015 |
| WO | WO 2015/179332 | A1 | 11/2015 |
| WO | WO 2015/181928 | A1 | 12/2015 |

OTHER PUBLICATIONS

U.S. Appl. No. 09/956,987, filed Sep. 18, 2001, Hammerslag, Including its prosecution history.

"Strength of materials used to make my Safety Harnesses," Elaine, Inc. Jul. 9, 2012. Retrieved from <https://web.archive.org/web/20120709002720/http://www.childharness.ca/strength_data.html> on Mar. 17, 2014, 2 pages.

International Search Report and Written Opinion for PCT/US2013/032326 mailed Jun. 14, 2013, 27 pages.

International Preliminary Report on Patentability for PCT/US2013/032326 issued Sep. 16, 2014, 6 pages.

International Search Report and Written Opinion for PCT/US2013/057637 mailed Apr. 7, 2014, 34 pages.

International Preliminary Report on Patentability for PCT/US2013/057637 issued Mar. 3, 2015, 9 pages.

International Search Report and Written Opinion for PCT/US2013/068342 mailed Apr. 7, 2014, 29 pages.

International Preliminary Report on Patentability for PCT/US2013/068342 issued May 5, 2015, 9 pages.

International Search Report and Written Opinion for PCT/US2014/014952 mailed Apr. 25, 2014, 17 pages.

International Preliminary Report on Patentability for PCT/US2014/014952 issued Aug. 11, 2015, 9 pages.

International Search Report and Written Opinion for PCT/US2014/066212 mailed Apr. 22, 2015, 16 pages.

International Search Report and Written Opinion for PCT/US2014/032574 mailed Oct. 31, 2014, 19 pages.

International Search Report and Written Opinion for PCT/US2014/045291 mailed Nov. 6, 2014, 12 pages.

(56) References Cited

OTHER PUBLICATIONS

International Search Report and Written Opinion for PCT/US2014/013458 mailed May 19, 2014, 12 pages.
International Preliminary Report on Patentability for PCT/US2014/013458 issued Jul. 28, 2015, 7 pages.
International Search Report and Written Opinion for PCT/US2013/068814 mailed Jun. 9, 2014, 18 pages.
International Preliminary Report on Patentability for PCT/US2013/068814 issued May 12, 2015, 12 pages.
Notice of Reasons for Rejection from the Japanese Patent Office dated Feb. 26, 2015 for design application No. 2014-015570, 4 pages.
Receipt of Certificate of Design Registration No. 1529678 from the Japanese Patent Office for design application No. 2014-015570 dated Jun. 26, 2015, 1 page.
International Search Report and Written Opinion for PCT/US2014/055710 mailed Jul. 6, 2015, 19 pages.
International Search Report and Written Opinion for PCT/US2014/054420 mailed Jul. 6, 2015, 21 pages.
The Preliminary Rejections from the Korean Intellectual Property Office for Application No. 30-2014-34959 received Aug. 7, 2015, is not translated into English. The document requests a renaming of the application to be in accordance with Korean patent law, 5 pages total.
The Preliminary Rejections from the Korean Intellectual Property Office for Application No. 30-2014-34959 received Apr. 7, 2015, is not translated into English. The document requests a revision of the drawings to be in accordance with Korean patent law, 6 pages total.
Office Action received Oct. 8, 2015 from the German Patent and Trademark Office for Appln No. 402015100191.2, regarding the title of the invention, 2 pages.
Notice of Reasons for Rejection from the Japanese Patent Office dated Oct. 5, 2015 for design application No. 2015-004923, 4 pages.
International Search Report and Written Opinion for PCT/US2014/046238 mailed Nov. 21, 2014, 17 pages.
International Search Report and Written Opinion for PCT/US2014/020894 mailed Jun. 20, 2014, 12 pages.
International Search Report and Written Opinion for PCT/US2014/041144 mailed Dec. 10, 2014, 13 pages.
"Save Tourniquet," 3 pages. Copyright 2015. Accessed on Dec. 11, 2015. Retrieved from http://www.savetourniquet.com/.
Certificate of Design Registration No. 30-809409 on Aug. 3, 2015 from the Korean Intellectual Property Office for Appln No. 30-2015-11475, 2 pages.
Certificate of Design Registration No. 30-809410 on Aug. 3, 2015 from the Korean Intellectual Property Office for Appln No. 30-2015-11476, 2 pages.
European Search Report for EP 14168875 mailed Oct. 29, 2014, 9 pages.
Anonymous, "Shore durometer," Wikipedia, the free encyclopedia, Mar. 10, 2012, XP002747470, Retrieved from the Internet: URL: https://en.wikipedia.org/w/index.php?title=Shore_durometer&oldid=481128180 [retrieved on Oct. 20, 2015]* shore A, shore D, durometer, polymer, rubber, gel; the whole document *, 6 pages.
Asolo® Boot Brochure Catalog upon information and belief date is as early as Aug. 22, 1997, 12 pages.

* cited by examiner

100

104

106

1702

1802

1902

1902

1902

2002

2102

2202

2300

2300

2400

2500

LACE FIXATION ASSEMBLY AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue application of U.S. Pat. No. 9,439,477, which is U.S. application Ser. No. 14/166,799, filed Jan. 28, 2014, entitled "LACE FIXATION ASSEMBLY AND SYSTEM," which* claims the benefit of U.S. Provisional Patent Application No. 61/757,692, filed Jan. 28, 2013, entitled LACE FIXATION SYSTEM WITH LOW FRICTION GUIDES, the entirety of which is incorporated by reference for all purposes.

*More than one reissue application has been filed for the reissue of U.S. Pat. No. 9,439,477. The reissue applications are U.S. application Ser. No. 16/130,943 (the present application) and U.S. application Ser. No. 16/826,105 and U.S. application Ser. No. 16/826,150, which are divisional reissues of U.S. Pat. No. 9,439,477.*

SUMMARY

Various lace fixation assemblies and systems beneficial to both manufacturers and users. In particular, the lace fixation assemblies and systems of the present disclosure may provide an easy to understand and easy to use means of adjusting and securing the closure of an article of footwear or other item. The lace fixation assemblies and systems of the present disclosure may further allow the use of small-diameter, low-friction lace material that does not require gripping by hand to secure or tighten. The lace fixation assemblies and systems of the present disclosure may further provide a convenient means to store excess lace after tightening while allowing quick and easy release and refastening of the fixation for secondary tension adjustment. The lace fixation assemblies and systems of the present disclosure may further be of a design and material such as plastic or other synthetic material that is economical to produce and to incorporate into existing manufacturing methods.

For example, in a first aspect, a lacing system for tightening an article is disclosed. The lacing system may include or comprise a fixation member coupled to the article, the fixation member having at least one entry aperture and an exit aperture with a lumen extending therebetween, the fixation member also having a spool with a fixation post. In this example, the fixation member may be rigidly fastened to the article. The lumen may include or comprise of a passage, a cavity, a tube structure, or the like. Further, the spool may include or comprise of a flanged cylinder whereby an element may be wound around or to the post. Other embodiments are possible.

The lacing system may further include or comprise a tension member having an intermediate portion slidably disposed within the lumen of the fixation member such that a proximal portion of the tension member is positioned on a proximal side of the fixation member and a distal portion of the tension member is positioned on a distal side of the fixation member and such that a length of the proximal portion and a length of the distal portion is adjustable via sliding of the tension member within the lumen. In this example, the tension member may include or comprise a lace or lacing that has a particular diameter. The tension member may generally be laced to the fixation member, and a length of the tension member protruding or exiting from the fixation member may be adjusted as desired. Other embodiments are possible.

The lacing system may further include or comprise a plurality of guide members coupled to the article on the proximal side of the fixation member to guide the proximal portion of the tension member along the article to the fixation member. In this example, the tension member may generally be laced to each of the plurality of guide members. Other embodiments are possible. The lacing system may further include or comprise a tensioning component coupled to the distal portion of the tension member to effect sliding of the tension member within the lumen and thereby tighten the article by adjusting the length of the proximal portion of the tension member, and to maintain a tightness of the article by winding of the tension member about the fixation post, wherein the tensioning component is securable to the spool of the fixation member. In this example, the tension member together with other elements or features of the example lacing system may be used to tighten the article whereby the tension may be stored to the spool. Other embodiments are possible.

Additionally, or alternatively, the fixation member of the lacing system may include a flange shaped complementary to the panel. Additionally, or alternatively, the lumen of the lacing system may extend between the entry aperture and the exit apertures in an arcuate configuration, so that the lumen may be guided through the fixation member in a gentle manner with minimized frictional resistance. Additionally, or alternatively, the plurality of guide members the lacing system may be configured to direct lacing along the panel of the article with or without overlap to the at least one lacing entry aperture and through the lacing exit aperture. Such a feature may be selected as desired and may be implementation-specific. Additionally, or alternatively, the tensioning component of the lacing system may be a ring-shaped element that may be snap-fit coupleable to the spool protrusion. Additionally, or alternatively, the spool protrusion and the tensioning component of the lacing system may each comprise a plurality of traction members that when engaged inhibit rotation of the tensioning component when the tensioning component is secured to the spool protrusion. Such a feature may prevent unwanted or undesired loosening of the tension member when the tensioning component is positioned to the spool protrusion. Other embodiments are possible.

In another aspect, a lacing system for tightening an article is disclosed. The lacing system may include or comprise first plate coupleable to a first panel of the article and defining at least one lacing entry aperture, a lacing exit aperture, and a keyed protrusion that is positioned to a complementary recess of a second plate of the lacing system to form a groove with a lacing fixation post. In this example, the keyed protrusion and complementary recess may facilitate secure coupling of the first plate with the second plate. Other embodiments are possible. The lacing system may further include or comprise a lacing tensioner coupleable to lacing protruding from the lacing exit aperture and to a periphery of the groove so that the lacing tensioner is securable to the groove when lacing protruding from the lacing exit aperture is wound to the lacing fixation post for tightening the article by pulling together a second panel and a third panel of the article. Other embodiments are possible.

Additionally, or alternatively, the first plate of the lacing system may further define a first plurality of ridged flutes extending radially from the keyed protrusion in a spoke pattern, and the second plate further defining a second plurality of ridged flutes extending radially from the recess in the spoke pattern and offset the first plurality of ridged flutes. Such a feature may maintain lacing tension when lacing protruding from the lacing exit aperture is wound to the lacing fixation post for tightening the article. Additionally, or alternatively, the lacing system may include a plurality of lacing guide members coupleable to the first panel to direct lacing along the first panel to the at least one lacing entry aperture and through the lacing exit aperture. Additionally, or alternatively, the lacing system may include a fastener positioned through an aperture of the keyed protrusion and an aperture of the recess to rigidly secure the keyed protrusion to the recess. Other embodiments are possible.

In another aspect, a method for tightening an article using a lacing system is disclosed. The lacing system may include one or more of the features: a fixation member coupled to the article, the fixation member having at least one entry aperture and an exit aperture with a lumen extending therebetween, and also having a spool with a fixation post; a tension member having an intermediate portion slidably disposed within the lumen of the fixation member so that a proximal portion of the tension member is positioned on a proximal side of the fixation member and a distal portion of the tension member is positioned on a distal side of the fixation member; a plurality of guide members coupled to the article on the proximal side of the fixation member to guide the proximal portion of the tension member along/about the article to the fixation member; and a tensioning component coupled to the distal portion of the tension member. Further, the method may include or comprise tensioning the tension member via the tensioning component to effect sliding of the tension member within the lumen and thereby tighten the article by shortening the length of the proximal portion of the tension member. The method may further include or comprise winding the tension member about the fixation post via the tensioning component to maintain a tightness of the article, wherein the tensioning component is securable to the spool of the fixation member.

Additionally, or alternatively, the method may include or comprise securing the tensioning component to the spool of the fixation member. Such a feature may allow for storage of the tensioning component when not in use. Additionally, or alternatively, the method may include or comprise positioning the tension member to the lumen of the fixation member to lace the tension member to the fixation member. Additionally, or alternatively, the method may include or comprise positioning the tension member to the plurality of guide members to lace the tension member to the plurality of guide members with or without overlap of the tension member. Additionally, or alternatively, the method may include or comprise positioning the tension member to the tensioning component to couple the tension member to the tensioning component. Additionally, or alternatively, the method may include or comprise winding the tension member within a gap about the fixation post that includes a plurality of radially offset ridged flutes to engage and maintain tension to the tension member. Additionally, or alternatively, the method may include or comprise winding excess length of the tension member within a gap about the fixation post to store the excess length of tension member about the fixation post. Other embodiments are possible.

Although not so limited, an appreciation of the various aspects of the present disclosure along with associated benefits and/or advantages may be gained from the following discussion in connection with the drawings.

Figure 1:
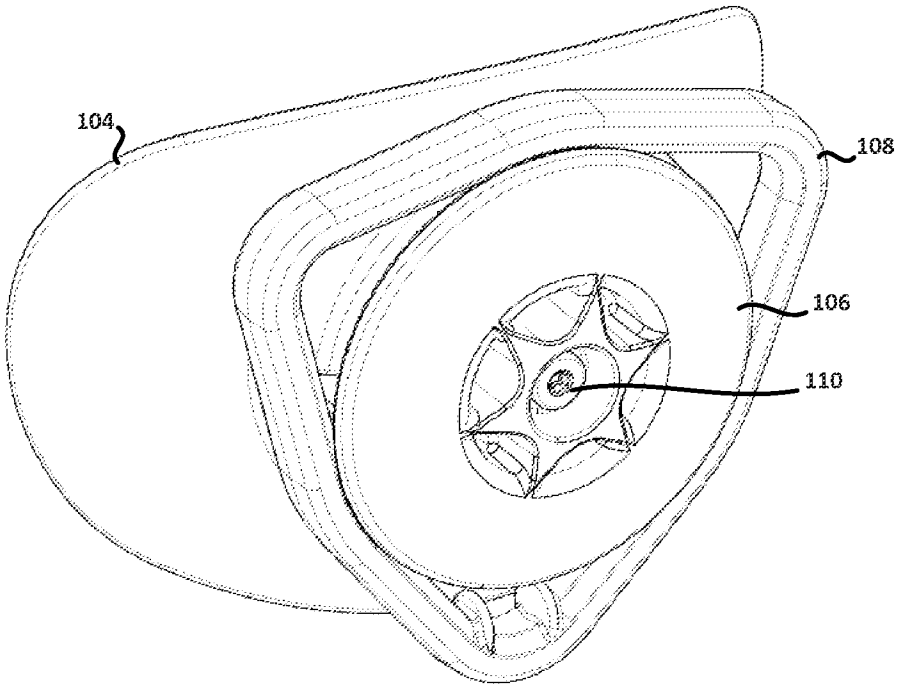
FIG. 1 shows a first lace fixation assembly.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Different methods for closing or tightening shoes or boots and other flexible or semi-rigid panels have evolved over the years. Conventional laces whether led through metal eyelets, webbing loops, or low friction guides, have stood the test of time and remain popular. Mechanical systems using rotary dials, serrated grip surfaces and other designs may provide alternatives to knot-secured laces. Hook and loop engagements as well as elastic straps may also serve well in some applications. Currently available designs though present certain drawbacks. For example, conventional laces require the tying of a knot to secure the tightened adjustment, which obligates the user to untie the knot before any secondary adjustment can be made, unless or until the knot loosens of its own accord, requiring retying. Conventional lace systems are also limited to the use of relatively large diameter laces that are comfortable to grip by hand, the opposite desired characteristics for low-profile, efficient and effective closure. Rotary dials and other mechanical systems eliminate the knot problem and can make use of small diameter laces, but tend to be expensive to manufacture, to the point that they can represent up to 50% of the cost of a given pair of footwear. Some knotless fixation systems self-store excess lace while others require excess lace to be gathered and placed into a pocket on the boot, which is an inconvenient and inelegant solution.

Given the harsh environment of daily use, often in climate extremes, mechanical system latching performance may also be problematic, often when a secure closure is needed most. Hook and loop and elastic systems also suffer performance loss in wet and/or freezing conditions, while being limited in the adjustment range and security of their closure. In addition to fixation issues, many lace systems suffer from excessive friction which can prevent the lace from exerting sufficient closure force in the area farthest from the point where tension is applied. This friction can have many causes including the lace material characteristic, the lace turning guides, the sliding of the lace over high friction surfaces, and also the points at which opposing laces cross over one another. In this aspect of lace function, the dilemma becomes one in which the more tension applied to tighten the closure, the more frictional force is created and the more difficult it becomes to obtain the desired closure. The present disclosure addresses these and other issues by providing a non-complex, inexpensive, non-mechanical, low-friction, knotless closure system with self-storage of excess lace.

Figure 2:
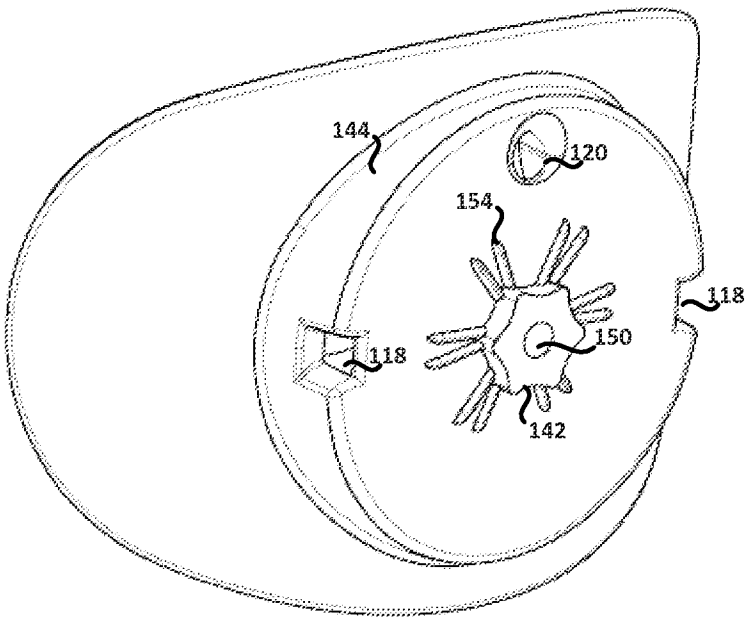
FIG. 2 shows a first plate of the assembly of FIG. 1.
Figure 3:
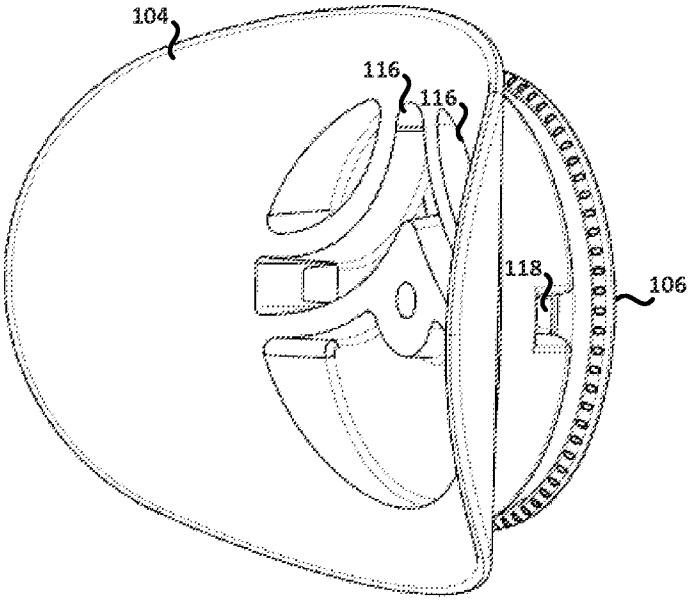
FIG. 3 show a first view of a first and second plate of the assembly of FIG. 1.
Figure 4:
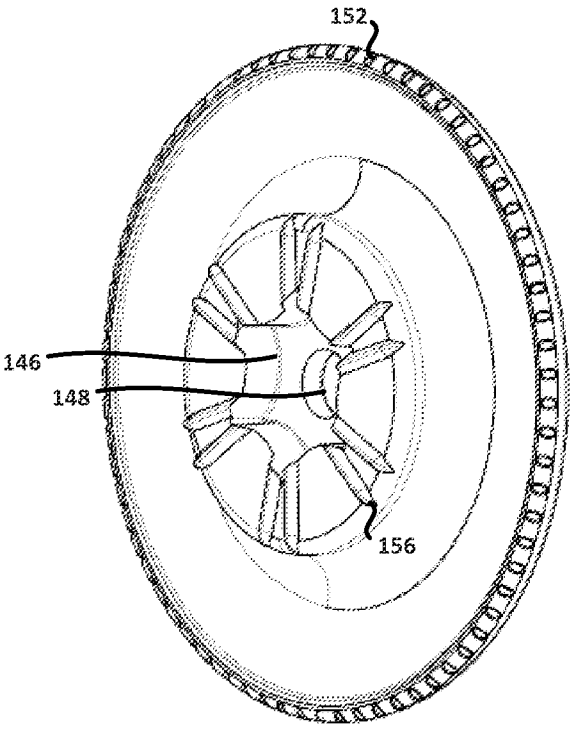
FIG. 4 shows a second plate of the assembly of FIG. 1.

For instance, referring now collectively to FIGS. 1-8, first lace fixation assembly 100 and first lace fixation system 102 are shown in accordance with the present disclosure. In general, first assembly 100 includes first plate 104, second plate 106, tensioning component 108, and fastener 110. FIG. 1 for example illustrates these respective components of first assembly 100 in an assembled configuration. First system 102 includes first assembly 100, guide members 112, and tension member 114. FIG. 8A for example shows these respective components of first system 102 in an assembled configuration. In the example embodiment, tension member 114 is laced through first plate 104 of first assembly 100 via arcuate slots 116 that guide ends of tension member 114 from entry apertures 118 to exit aperture 120. FIG. 2 for example illustrates entry apertures 118 and exit aperture 120, and FIG. 3 for example illustrates arcuate slots 116. Tension member 114 is further laced through guide members 112 via opposing grooves 122 so that tension member 114 does not overlap onto itself when laced thereto. Both first assembly 100, at least in part, and guide members 112 are coupled to front panel 124 of boot 126, and tensioning end 128 of tension member 114 is coupled to tensioning component 108 at notch 130 of tensioning component 108. FIGS. 8A-B for example illustrate coupling of first assembly 100 and guide members 112 to boot 126 as well as tension member 114 to tensioning component 108.

Figure 5:
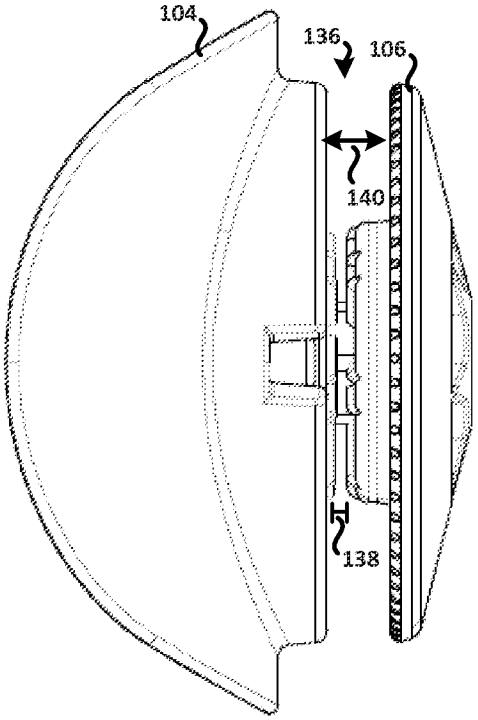
FIG. 5 show a second view of a first and second plate of the assembly of FIG. 1.
Figure 6:
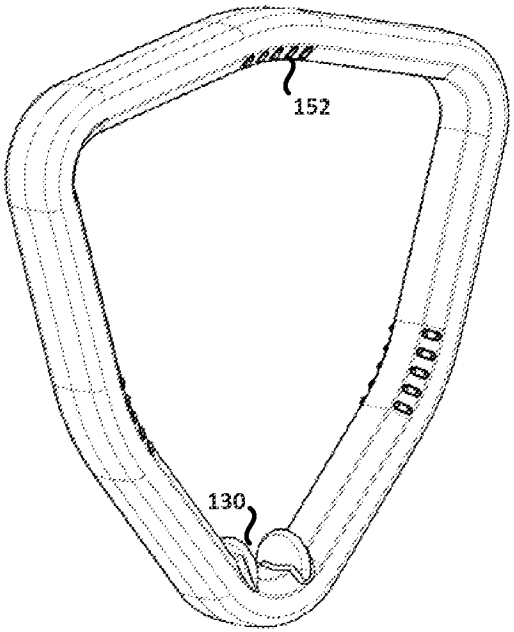
FIG. 6 shows a tensioning component of the assembly of FIG. 1.

In practice, tightening of boot 126 is performed or perfected by application of pulling force to tensioning component 108, forcing first side panel 132 and second side panel 134 of boot 126 together. While maintaining pulling force, tensioning component 108 is used to wrap tension member 114 into channel or groove 136 that is formed between first plate 104 and second plate 106. FIG. 5 for example illustrates groove 136 formed between first plate 104 and second plate 106. Here, initial wrapping of tension member 114 into groove 136 forces tension member 114 into friction gap 138 that has surfaces along the length of which imparts force on tension member 114 when positioned thereto so that tension is generally maintained on tension member 114 when pulling force is removed, as discussed further below. Further wrapping of tension member 114 into groove 136 forces portions of tension member 114 into storage gap 140. Storage gap 140 within groove 136 is therefore generally wider than friction gap 138 as storage gap 140 serves a different purpose than friction gap 138 in that it is used to store excess length of tension member 114. Tension member 114 as wrapped onto itself though within both friction gap 138 and storage gap 140 imparts force on itself when positioned thereto, so that tension is generally maintained on tension member 114 when pulling force is removed.

Wrapping of tension member 114 into groove 136 proceeds until length of tension member 114 protruding from exit aperture 120 is substantially wound into groove 136. Tensioning component 108 is then generally snap-coupled onto first assembly 100 at groove 136. Tensioning component 108 may be decoupled from first assembly 100 by application of leverage similar to that applied when opening a bottle having a cap, and may be used to unwind tension member 114 thereby loosening first side panel 132 and second side panel 134 of boot 126. First side panel 132 and/or second side panel 134 may then be opened to allow exit, or tension reapplied to tension member 114 as desired. Such an implementation may be beneficial or advantageous in many respects. For example, knotting of tension member 114 is not required, excess length of tension member 114 is stored to first assembly 100 without additional steps, and through the use of tensioning component 108, there is no need for a user to physically touch tension member 114. Still other benefits and/or advantages are possible as well.

Referring now specifically to FIGS. 1-6, first lace fixation assembly 100 is shown in accordance with the present disclosure. As mentioned above, first assembly 100 includes first plate 104, second plate 106, tensioning component 108, and fastener 110. When assembled, axle- or post-like keyed portion 142 formed on protrusion 144 of first plate 104, as shown for example in FIG. 2, is positioned to complementary recess 146 of second plate 106, as shown for example in FIG. 4. Additionally, fastener 110 is positioned to both second plate aperture 148 that is adjacent to recess 146 and first plate aperture 150 that is formed within keyed portion 142 to secure first plate 104 with second plate 106. In the example embodiment, keyed portion 142 and recess 146 are star-shaped in cross-section. Other embodiments are however possible, and shape of keyed portion 142 and recess 146 may be implementation-specific. Further, as mentioned above, tensioning component 108 is generally snap-fit coupleable to groove 136 that is formed between first plate 104 and second plate 106. Rotational movement of tensioning component 108 is limited or restricted when positioned to groove 136 by interlock of bumps or ridges 152 formed on both second plate 106 and tensioning component 108, illustrated for example at FIG. 4 and at FIG. 6.

Friction gap 138 within groove 136 is defined by first ridged flutes 154 that extend in a spoke pattern from keyed portion 142 of first plate 104, and second ridged flutes 156 that extend in the spoke pattern from recess 146 of second plate 106. FIG. 2 for example illustrates first ridged flutes 154, and FIG. 4 for example illustrates second ridged flutes 156. It is contemplated that more or fewer ridged flutes may be utilized in any pattern as desired, and further number and shape of first ridged flutes 154 and second ridged flutes 156 may be implementation-specific. In the example embodiment, when first plate 104 is coupled with second plate 106, first ridged flutes 154 and second ridged flutes 156 are rotationally offset from each other so as to form a path for tension member 114 similar to that formed by an interdigitated comb structure. In this instance, however, fingers of the comb structure are interdigitally arranged along a circle. In this manner, first ridged flutes 154 and second ridged flutes 156 are configured and arranged to impart force on tension member 114 when tension member 114 is positioned to friction gap 138 within groove 136, so that tension is generally maintained on tension member 114 when pulling force is removed.

Figure 7A:
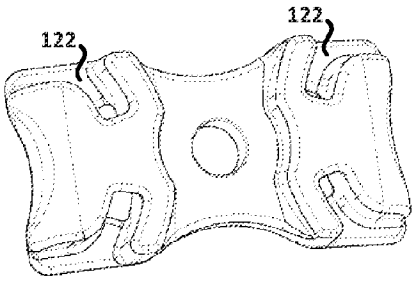
FIGS. 7A-C show various views of a guide member of a first lace fixation system.
Figure 7B:
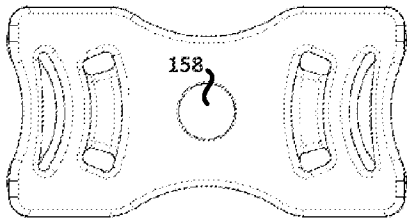
Figure 7C:
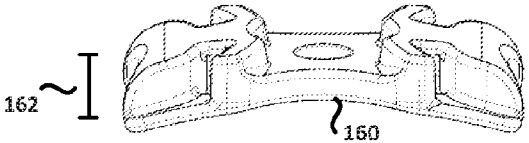

Referring now specifically to FIGS. 7A-C, a particular one of guide members 112 is shown in accordance with the present disclosure. As mentioned above, tension member 114 is laced through guide members 112 via opposing grooves 122 so that tension member 114 does not overlap onto itself. In general, grooves 122 positioned on each side of mounting aperture 158 provide a curved low-friction pathway for tension member 114 as it interfaces with panels 124, 132, and 134 of boot 126, similar to arcuate slots 116 of first plate 104 that provide a low-friction pathway for tension member 114 from entry apertures 118 to exit aperture 120. Whereas a typical lacing pattern may route laces back and forth between opposing panels, with laces crossing each other at various points along the center line of a particular panel, guide members 112 eliminate lace crossing and resulting friction that which may impede closure. It is contemplated that any number of guide members 112 may be employed to realize desired closure characteristics while maintaining the lowest possible lace system friction.

In the present example, with guide members 112 attached to center portion of front panel 124, tension member 114 is guided from first side panel 132 through a particular one of guide members 112, and back to first side panel 132. Similarly, tension member 114 is guided from second side panel 134 through a particular one of guide members 112, and back to second side panel 134. Tension member 114 thus does not overlap onto itself and does not bind, chafe, or create excess friction. It is contemplated that body 160 of guide members 112 may be curved to generally match the shape of front panel 124 or other intermediate panel onto which they are coupled. Further, profile or thickness 162 of guide members 112 may be defined such that tension member 114 is raised above a surface of an intermediate panel to further reduce friction. Various methods may be employed to attach guide members 112 to front panel 124, such as in a manner that allows guide members 112 to self-align under loads presented by tension member 114. Further, in order to facilitate injection molding with minimal tooling complexity, in one embodiment the bearing surface of the guide members 112 may be formed by alternating grooves in top and bottom surfaces. This arrangement may sufficiently capture tension member 114, keeping tension member 114 bearing upon the desired radius surface, while not requiring any sliding elements in the injection mold.

Figure 8A:
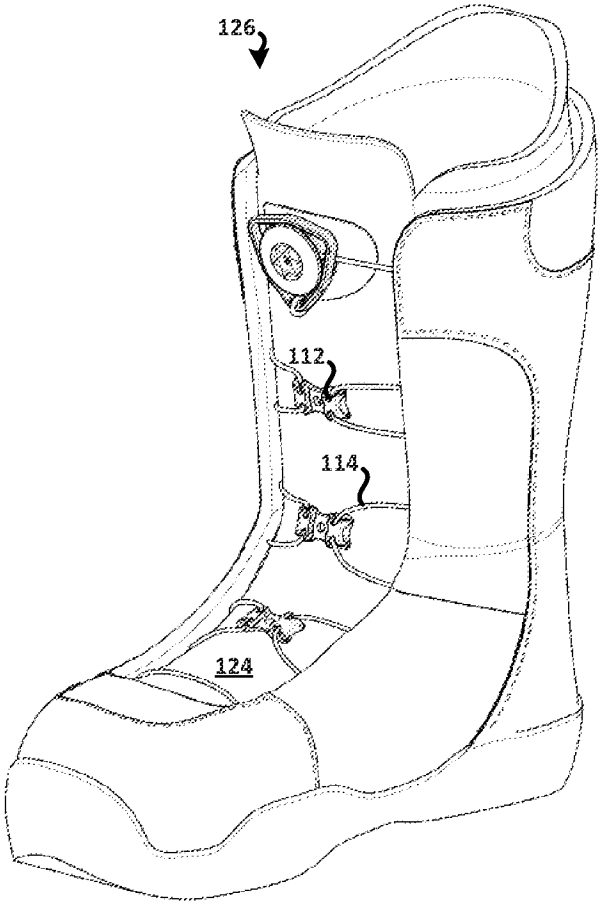
FIGS. 8A-C show various views of a first lace fixation system.
Figure 8B:
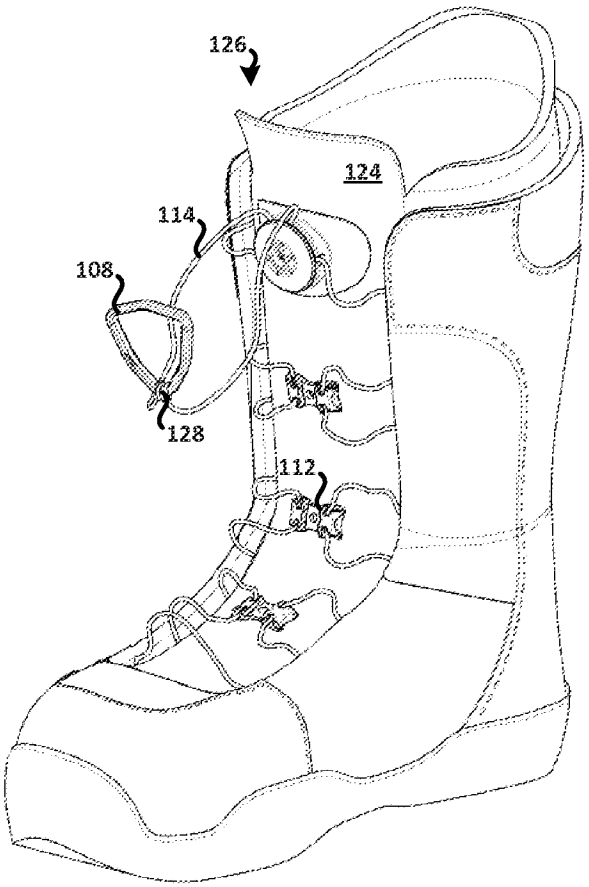
Figure 8C:
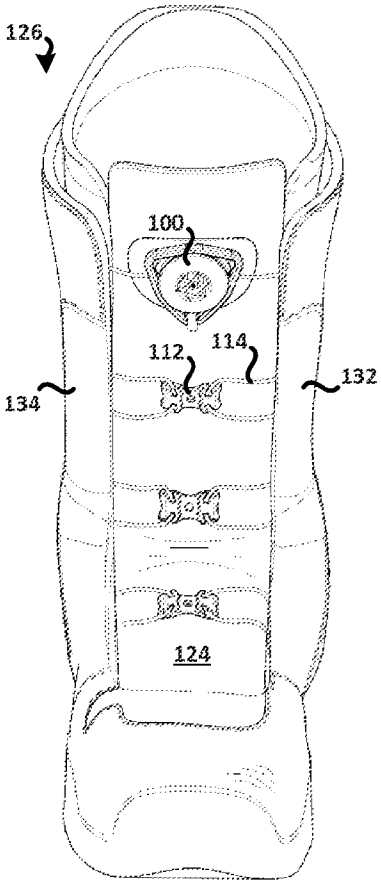
Figure 9:
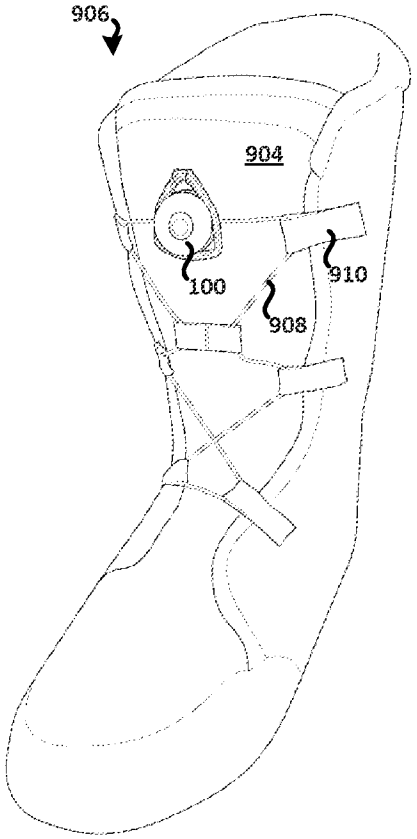
FIG. 9 shows a view of another lace fixation system.

Referring now to FIG. 9, another lace fixation system 902 is shown in accordance with the present disclosure. System 902 is similar to first lace fixation system 102 as described above in many respects. For example, system 902 includes first lace fixation assembly 100 of at least FIG. 1 coupled to front panel 904 of boot 906. In the example embodiment, however, tension member 908 is laced through guide members 910 so as to overlap or cross itself. Guide members 910 in FIG. 9 are webbing or fabric strips that are sewn or otherwise coupled to panels of the article. The webbing or fabric strips 910 include loops through which the tension member 908 is inserted. The webbing or fabric strips 910 may be angled or directed to guide the tension member 908 about the article as desired. In practice though, tightening of boot 906 using first assembly 100 may be performed in a manner similar to that described above. Further, FIG. 9 demonstrates flexibility of first assembly 100 in that tensioning component 108 may be coupled to groove 136 (e.g., see FIG. 5) that is formed between first plate 104 and second plate 106 without orientation-specific keying. In other words, tensioning component 108 may be coupled to groove 136 in any particular orientation. For example, FIG. 8C illustrates tensioning component 108 positioned to groove 136 so that notch 130 is orientated towards guide members 112. In contrast, FIG. 9 illustrates tensioning component 108 positioned to groove 136 so that notch 130 is orientated away from guide members 910.

Figure 14:
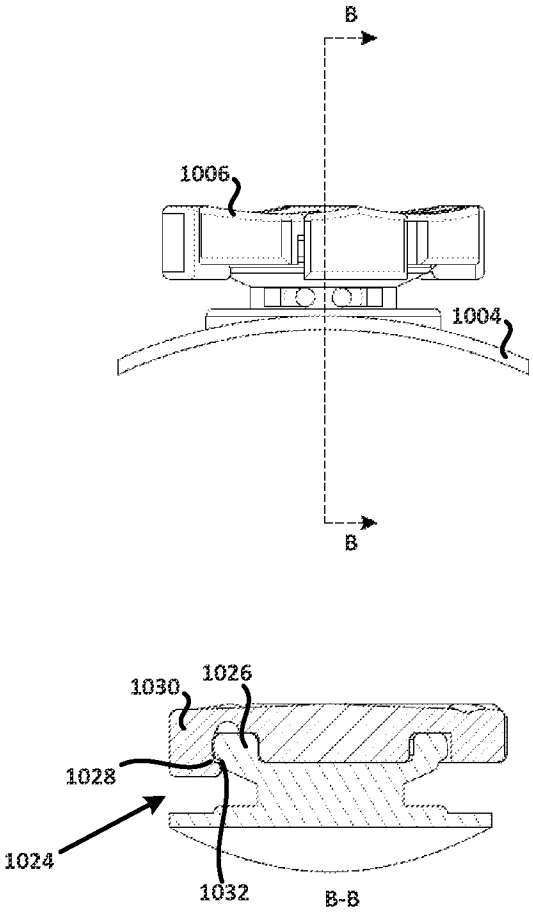
FIG. 14 shows a second cross-section B-B of the assembly of FIG. 9.
Figure 15:
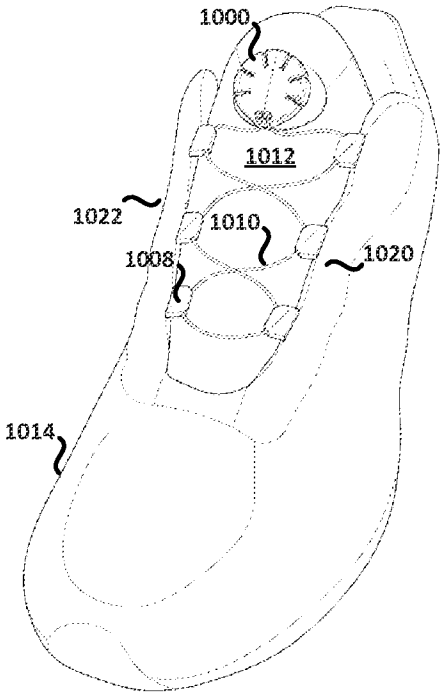
FIG. 15 shows a view of still another lace fixation system.

Referring now to FIGS. 10A-16B, second lace fixation assembly 1000 and second lace fixation system 1002 are shown in accordance with the present disclosure. In general, second assembly 1000 includes plate 1004 and tensioning component 1006. FIG. 10B for example illustrates these respective components of second assembly 1000 in an assembled configuration. Second system 1002 includes second assembly 1000, guide members 1008, and tension member 1010. FIG. 15 for example illustrates these respective components of second system 1002 in an assembled configuration. In the example embodiment, tension member 1010 is laced through plate 1004 of second assembly 1000 via plate apertures 1011 that guide tension member 1010 through plate 1004, and further is laced through guide members 1008 so that tension member 1010 overlaps onto itself. FIG. 12C for example illustrates plate apertures 1011, and FIG. 15 and FIG. 16A for example illustrate lacing of tension member 1010 through guide members 1008 that are coupled to boot 1014, and lacing of tension member 1010 through plate 1004, respectively. Other embodiments though are possible. For example, it is contemplated that guide members 112 as discussed above may be used in place of guide members 1008.

Figure 11A:
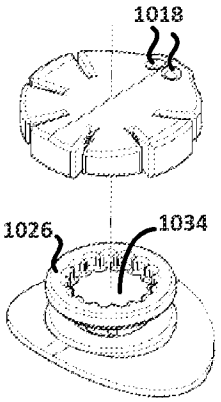
FIGS. 11A-C show various exploded views of the assembly of FIG. 9.
Figure 11B:
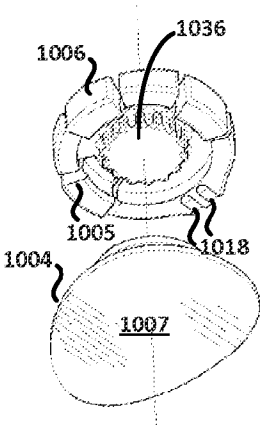
Figure 11C:
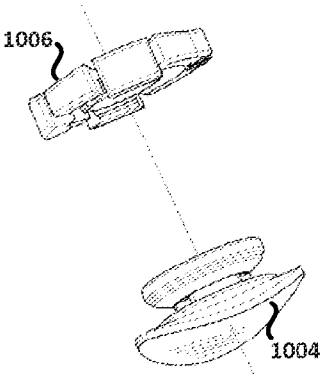
Figure 12A:
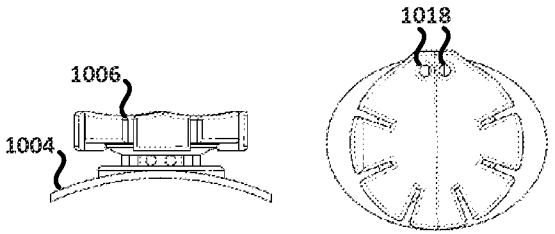
FIGS. 12A-C show multiple embodiments of the assembly of FIG. 9.
Figure 12B:
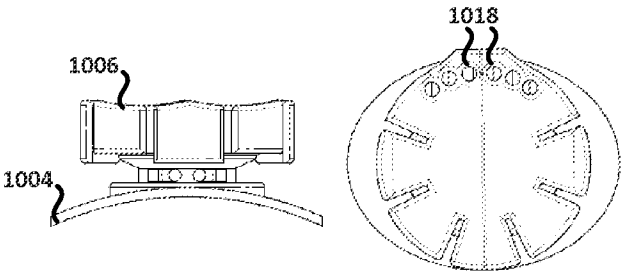
Figure 12C:
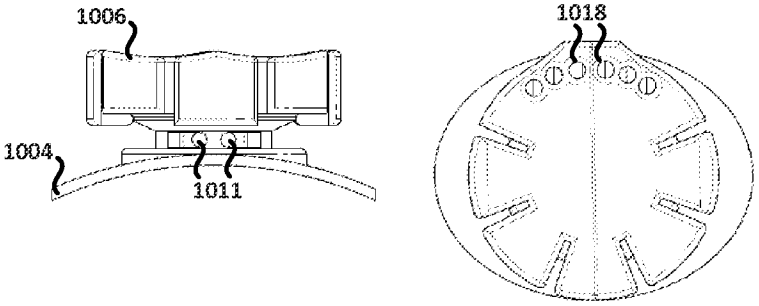
Figure 13:
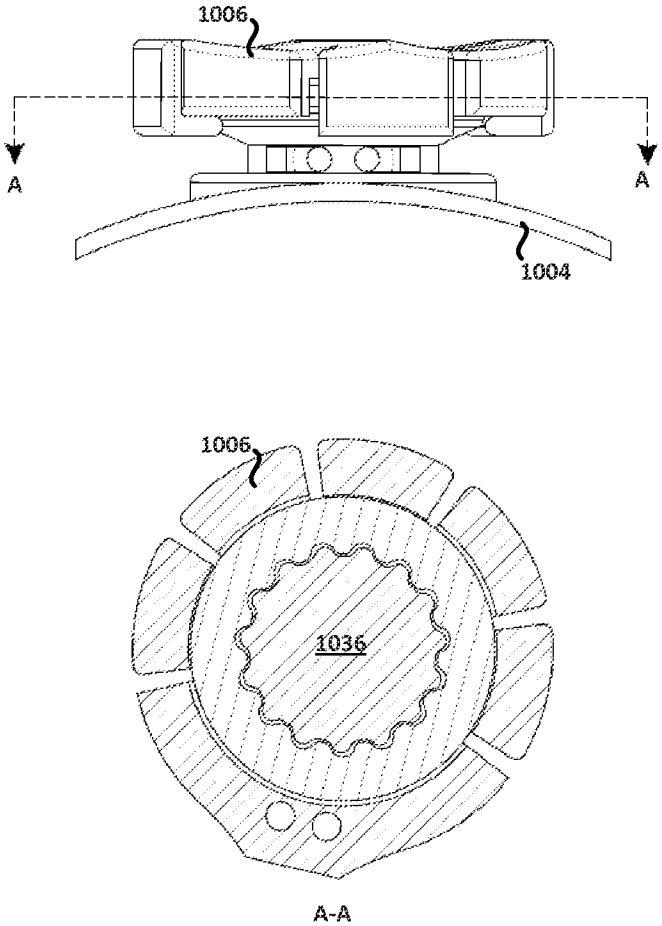
FIG. 13 shows a first cross-section A-A of the assembly of FIG. 9.

Both second assembly 1000, at least in part, and guide members 1008 are coupled to front panel 1012 of boot 1014, and tensioning end 1016 of tension member 1010 is coupled to tensioning component 1006 at component apertures 1018. FIGS. 11A-B for example illustrate component apertures 1018 of tensioning component 1006, and FIG. 16A for example illustrates tensioning end 1016 of tension member 1010 coupled to tensioning component 1006. In the example embodiment, component apertures 1018 flare open into elongated slots on bottom side 1005 of tensioning component 1006 to gently guide tension member 1010 therethrough, and plate 1004 includes primary surface 1007 that may be curved to at least partially conform to shape of panel 1012 of boot 1014, similar to first plate 104 of first assembly 100 shown at least in FIG. 1.

Figure 10A:
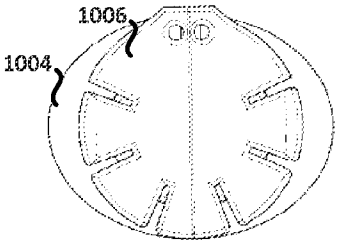
FIGS. 10A-D show various views of a second lace fixation assembly.
Figure 10B:
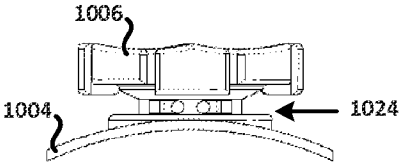
Figure 10C:
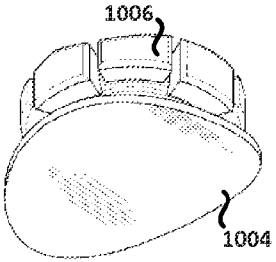
Figure 10D:
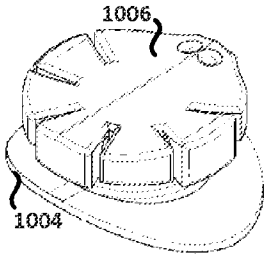

In practice, tightening of boot 1014 is performed or perfected by application of pulling force to tensioning component 1006, forcing first side panel 1020 and second side panel 1022 of boot 1014 together. While maintaining pulling force, tensioning component 1006 is used to wrap tension member 1010 into channel or groove 1024 formed by plate 1004. FIG. 10B for example illustrates groove 1024 formed by plate 1004. Wrapping of tension member 1010 tightly onto itself within groove 1024 fixes tension member 1010 in place, so that tension is generally maintained on tension member 1010 when pulling force is removed. Wrapping of tension member 1010 into groove 1024 proceeds until length of tension member 1010 protruding from component apertures 1018 is substantially wrapped into groove 1024. Tensioning component 1006 is then snap-coupled onto flange 1026 of plate 1004 so that locking surface 1028 of at least one flexible tab 1030 of tensioning component 1006 engages with locking surface 1032 of flange 1026 adjacent to groove 1024. FIG. 14 in a particular instance illustrates tensioning component 1006 snap-coupled onto flange 1026 of plate 1004. In the example embodiment, tensioning component 1006 may subsequently be decoupled from plate 1004 by application of leverage to tensioning component 1006 similar to that of opening certain types of aspirin containers for example, and may be used to unwind tension member 1010, thereby releasing force imparted on first side panel 1020 and second side panel 1022 of boot 1014. First side panels 1020 and/or second side panel 1022 may then be opened to allow exit, or tension reapplied to tension member 1010 as desired. Such an implementation may be beneficial or advantageous in many respects, including at least those discusses above in connection with first assembly 100.

Figure 16A:
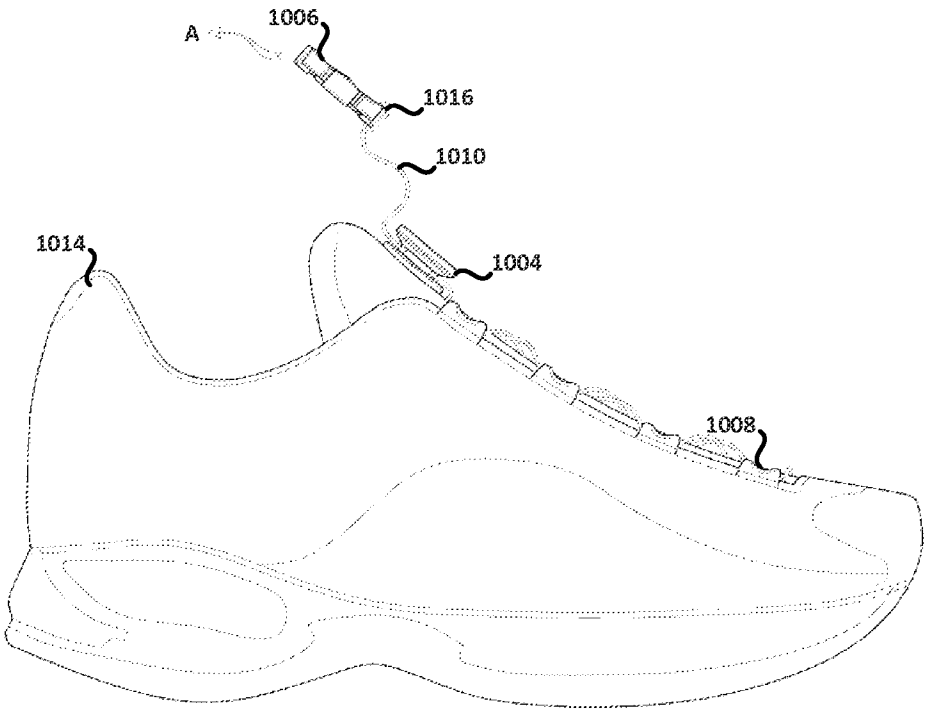
FIGS. 16A-B show various views of still another lace fixation system.
Figure 16B:
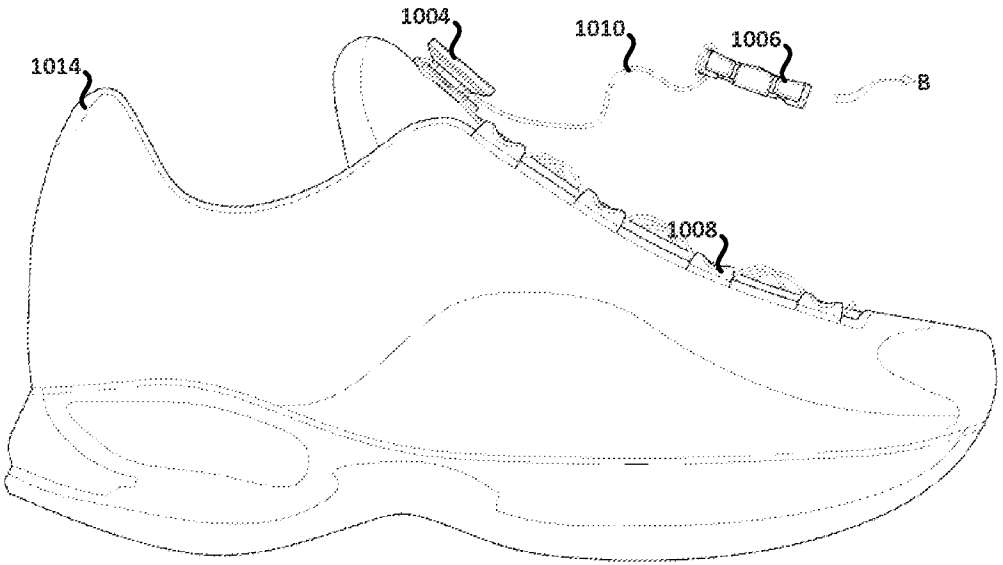

Further, referring now specifically to FIGS. 16A-B, flexibility of second assembly 1000 is demonstrated in that tension member 1010 may be laced through plate 1004 of second assembly 1000 in a particular direction as desired. For example, FIG. 16A illustrates tension member 1010 laced through plate 1004 of second assembly 1000 in a direction extending away from front end of shoe 1014, so that tightening of shoe 1014 is perfected by application of pulling force generally in direction A. In contrast, FIG. 16B illustrates tension member 1010 laced through plate 1004 of second assembly 1000 in a direction extending towards front end of boot 1014, so that tightening of boot is perfected by application of pulling force generally in direction B.

Referring now specifically to FIGS. 11-14, second lace fixation assembly 1000 is shown in accordance with the present disclosure. FIGS. 12A-C in particular show second assembly 1000 in varying dimension, generally increasing in size from FIG. 12A proceeding in order to FIG. 12C. As mentioned above, second assembly 1000 includes plate 1004 and tensioning component 1006. When assembled, keyed aperture 1034 formed within flange 1026 of plate 1004 is positioned to complementary post 1036 of tensioning component 1006. FIG. 11A and FIG. 11B for example illustrate keyed aperture 1034 formed within flange 1026 of plate 1004, and post 1036 of tensioning component 1006. In the example embodiment, keyed aperture 1034 and post 1036 are peripherally notched. Other embodiments are however possible. Tensioning component 1006 is snap-fit coupleable to keyed aperture 1034 formed within flange 1026 of plate 1004 by at least one flexible tab 1030 of tensioning component 1006 that has locking surface 1028 that engages with locking surface 1032 of flange 1026 adjacent groove 1024. FIG. 14 for example illustrates flexible tab 1030 of tensioning component 1006 that has locking surface 1028 that engages with locking surface 1032 of flange 1026 adjacent to groove 1024. In the example embodiment, rotational movement of tensioning component 1006 when coupled to plate 1004 is limited or restricted because post 1036 is rigidly fixed to plate 1004 at mounting surface 1038.

Figure 17:
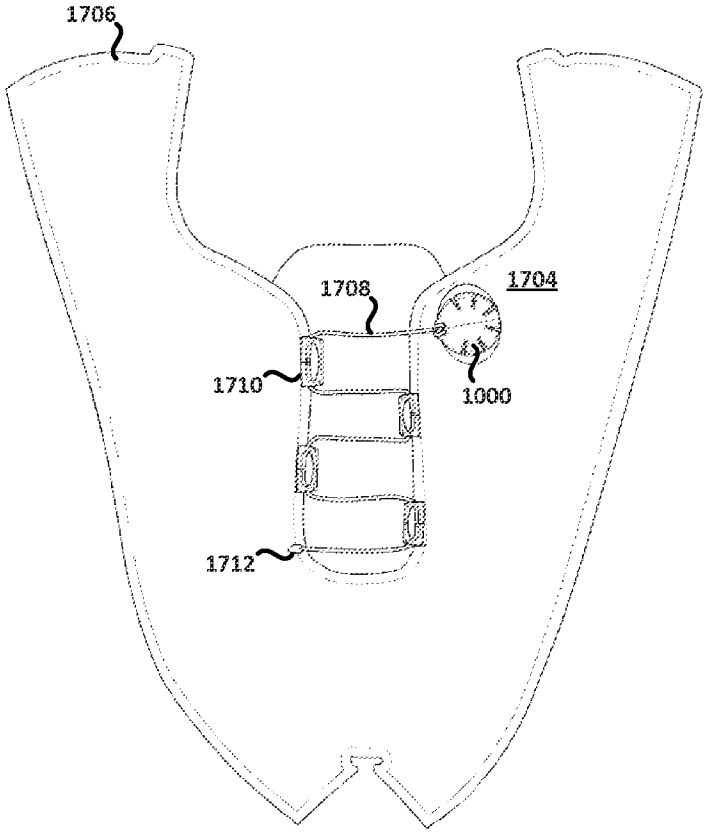
FIG. 17 shows a view of still another lace fixation system.

Referring now to FIG. 17, still another lace fixation system 1702 is shown in accordance with the present disclosure. System 1702 is similar to second lace fixation system 1002 as described above in many aspects. For example, system 1702 includes second lace fixation assembly 1000 of at least FIG. 10 coupled to panel 1704 of item 1706. In this example, however, second assembly 1000 is not coupled to a central panel of item 1706, and further tension member 1708 is alternately laced through guide members 1710 terminating at end 1712. In practice though, tightening of item 1706 using second assembly 1000 may be performed in a manner similar to that described above. Further, FIG. 17 demonstrates flexibility of second assembly 1000 in that second assembly 1000 may generally be coupled to a particular item at any location as desired, such as to an eyestay of a shoe as illustrated in FIG. 17. Termination at end 1712 as shown in FIG. 17 may increase the tension imparted to tension member 1708 as the system is used to close item 1706. Still other lace fixation systems embodiments are possible.

Figure 18:
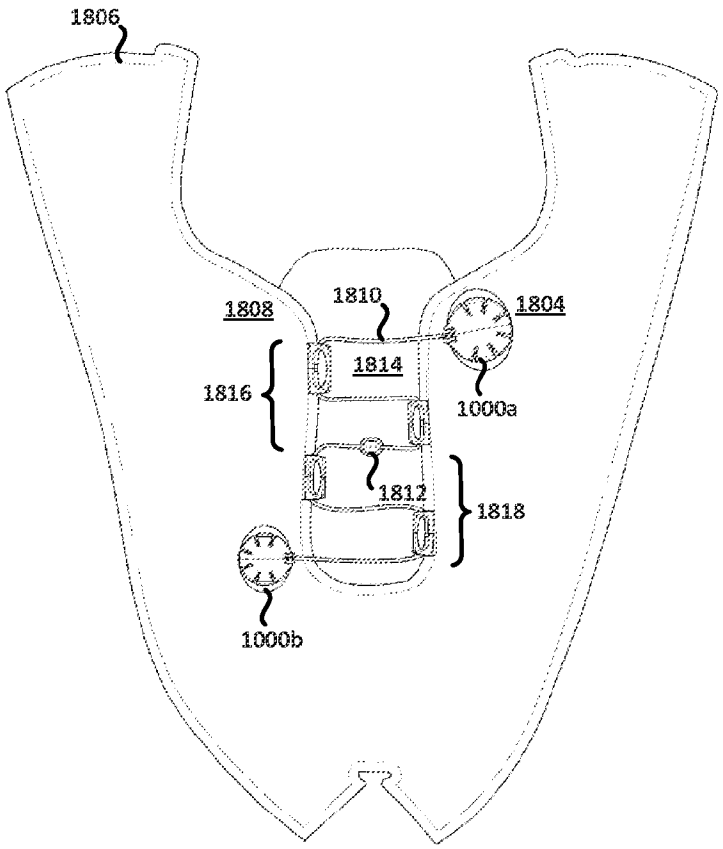
FIG. 18 shows a view of still another lace fixation system.

For example, referring now to FIG. 18, still another lace fixation system 1802 is shown in accordance with the present disclosure. System 1802 is similar to second lace fixation system 1002 as described above in many aspects. For example, system 1802 includes first instance 1000a of second lace fixation assembly 1000 of at least FIG. 10 coupled to first panel 1804 of item 1806. In this example, however, system 1802 further includes second instance 1000b of second lace fixation assembly 1000 coupled to second panel 1808 of item 1804, and tension member 1810 is coupled to fixed guide 1812 positioned to central panel 1814 of item 1806. In some embodiments, first instance 1000a of second assembly 1000 and second instance 1000b of second assembly 1000 may be sized differently, for example as illustrated in FIG. 12. Such an implementation as shown in FIG. 18 may be an example of a zone or zonal tightening system, whereby tension imparted on first length 1816 of tension member 1808 may be controlled by first instance 1000a of second assembly 1000, and tension imparted on second length 1818 of tension member 1808 may be controlled by second instance 1000b of second assembly 1000. Tension member 1810 may be fixedly coupled with fixed guide 1812 (i.e., the tension member 1810 may be prevented from sliding through guide 1812) to allow zonal tensioning of a proximal and distal portion of item 1806. Still other lace fixation system embodiments are possible.

Figure 19A:
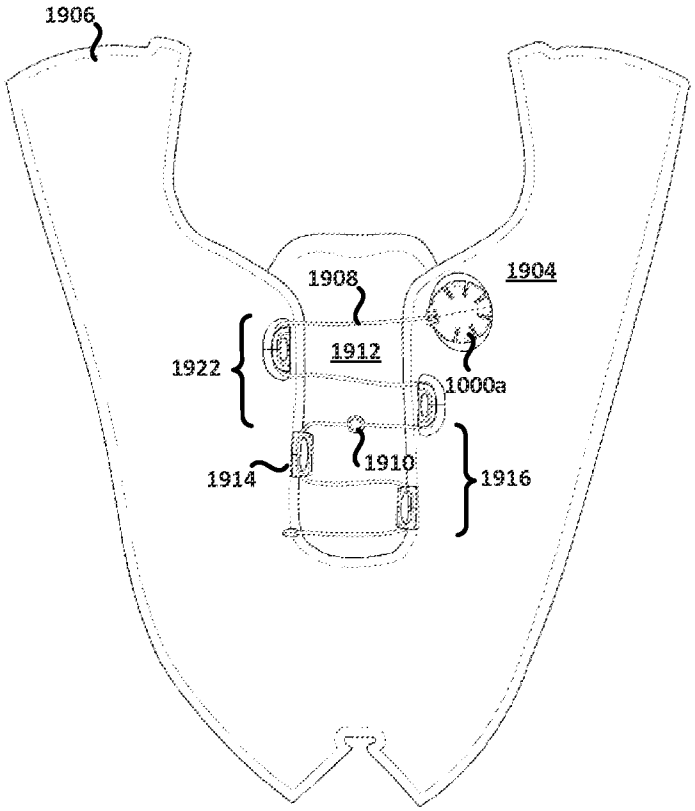
FIGS. 19A-E show various views of still another lace fixation system.
Figure 19B:
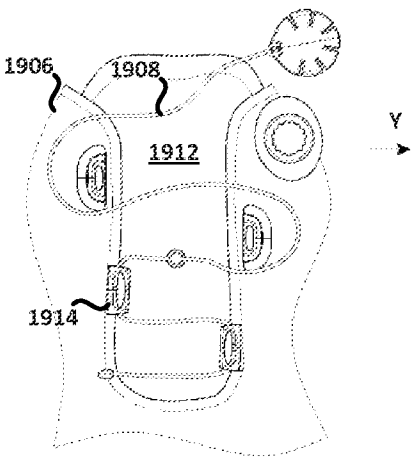
Figure 19C:
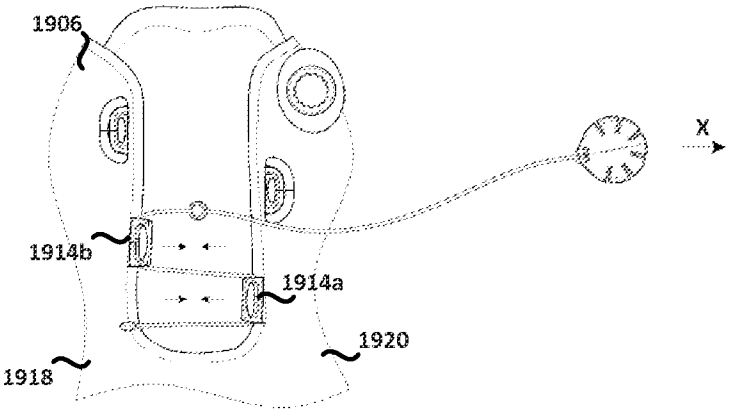
Figure 19D:
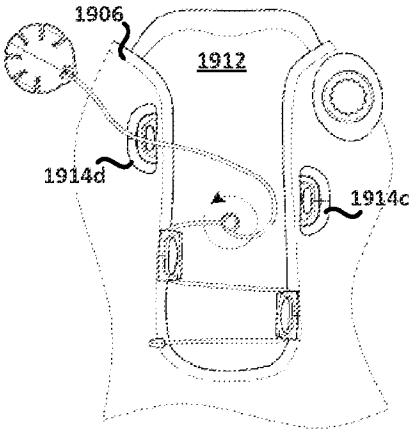
Figure 19E:
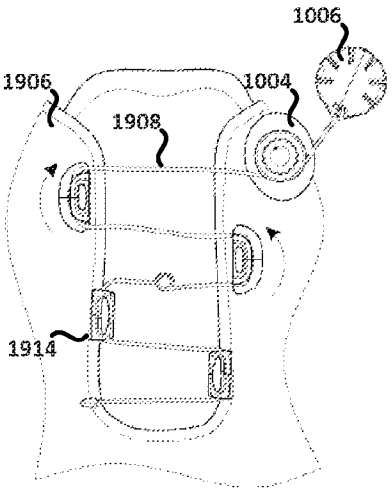

For example, referring now to FIGS. 19A-E, still another lace fixation system 1902 is shown in accordance with the present disclosure. System 1902 is similar to second lace fixation system 1002 as described above in many aspects. For example, system 1902 includes embodiment 1000a of second lace fixation assembly 1000 of at least FIG. 10 coupled to panel 1904 of item 1906. In this example, however, system 1902 includes tension member 1908 coupled to fixed guide 1910 positioned to central panel 1912 of item 1906. As shown in the sequence of FIGS. 19A-E, tension member 1908 may be positioned to guide members 1914 and fixed guide 1910 so that tension member 1908 may be wrapped and coupled to embodiment 1000a of second assembly 1000 in a manner such as described above. In particular, tension member 1908 may be initially laced to guide member 1914a and guide member 1914b positioned in a lower portion of the item, and then laced through fixed guide 1910 as shown in FIG. 19C, such as by inserting tension member 1908 through a lumen of fixed guide 1910. Tensioning component 1006 may then be pulled in direction X to apply tension to first length 1916 of tension member 1908, thereby pulling the lower portion of side panel 1918 and side panel 1920 together. Tension member 1908 may then be wrapped around a post of fixed guide 1910 to lock or maintain a tension of first length 1916 of tension member 1908 and thereby secure the lower portion in a tightened arrangement. Tension member 1908 may then be laced to guide member 1914c and guide member 1914d in an upper portion of the item. Tensioning component 1006 may then be pulled in direction Y to apply tension to second length 1922 of tension member 1908, thereby pulling the upper portion of side panel 1918 and side panel 1920 together. Tension member 1908 may then be wrapped into channel or groove 1024 formed by plate 1004 to lock or maintain a tension of second length 1922 of tension member 1908 and thereby secure the upper portion in a tightened arrangement. Such an implementation as shown in FIGS. 19A-E may be an example of a zone or zonal tightening system, whereby tension imparted on first length 1916 of tension member 1908 may be controlled or maintained due to coupling of tension member 1908 to fixed guide 1910, and tension imparted on second length 1922 of tension member 1908 may be controlled or maintained due to coupling of tension member 1908 to plate 1004. Still many other lace fixation system embodiments are possible.

Figure 20:
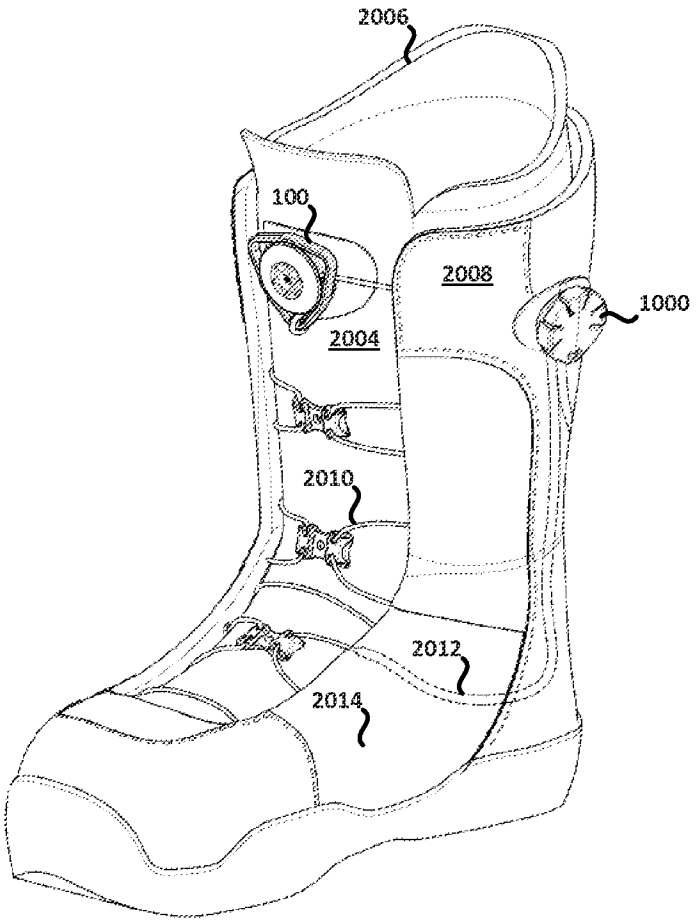
FIG. 20 shows a view of still another lace fixation system.

Referring now to FIG. 20, still another lace fixation system 2002 is shown in accordance with the present disclosure. System 2002 is similar to both first lace fixation system 102 and second lace fixation system 1002 as described above in many respects. For example, system 2002 includes first lace fixation assembly 100 of at least FIG. 1 coupled to first panel 2004 of item 2006, and also includes second lace fixation assembly 1000 of at least FIG. 10 coupled to second panel 2008 of item 2006. In this example, however, system 2002 includes first tension member 2010 coupled to first assembly 100 in a manner similar to that described above, and also includes second tension member 2012 coupled to second assembly 1000 in a manner similar to that described above. Here, second tension member 2012 is shown partially in phantom line as a portion of second tension member 2012 is routed generally underneath outer shell 2014 of item 2006, such as through tubing positioned under the upper of a boot. Such an implementation may be another example of a zone or zonal tightening system, whereby tension imparted on first tension member 2010 may be controlled by first assembly 100, and tension imparted on second tension member 2012 may be controlled by second assembly 1000. In the illustrated embodiment, first tension member 2010 and first assembly 100 is used to tighten an upper portion of a boot while second tension member 2012 and second lace fixation assembly 1000 is used to tighten a lower portion of a boot. Still other lace fixation system embodiments are possible.

Figure 21:
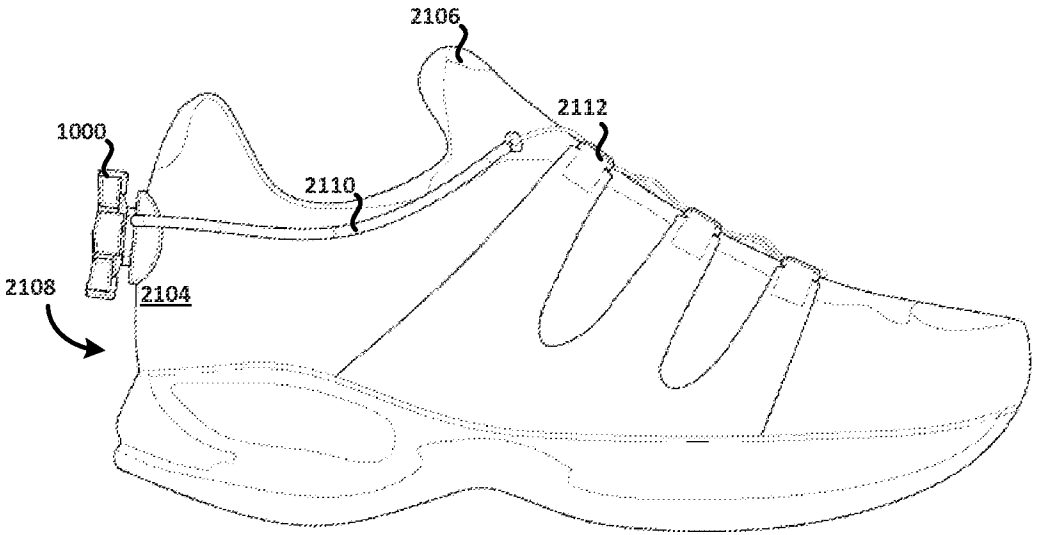
FIG. 21 shows a view of still another lace fixation system.

Referring now to FIG. 21, still another lace fixation system 2102 is shown in accordance with the present disclosure. System 2102 is similar to second lace fixation system 1002 as described above in many respects. For example, system 2102 includes second lace fixation assembly 1000 of at least FIG. 10 coupled to panel 2104 of item 2006. In this example, however, second assembly 1000 is not coupled to a central or offset panel of item 2106, and instead is coupled to rear portion 2108 of item 2106, such as heel portion of a shoe. Further, tension member 2110 is laced to second assembly 1000 at a point furthest possible from guide members 2112 of item 2106, such as by being routed through tubing coupled with and/or positioned under an upper material layer of the shoe. In practice though, tightening of item 2106 using second assembly 1000 may be performed in a manner similar to that described above. Further, FIG. 21 demonstrates flexibility of second assembly 1000 in that second assembly 1000 may generally be coupled to a particular item at any location as desired. Still other lace fixation system embodiments are possible.

Figure 22:
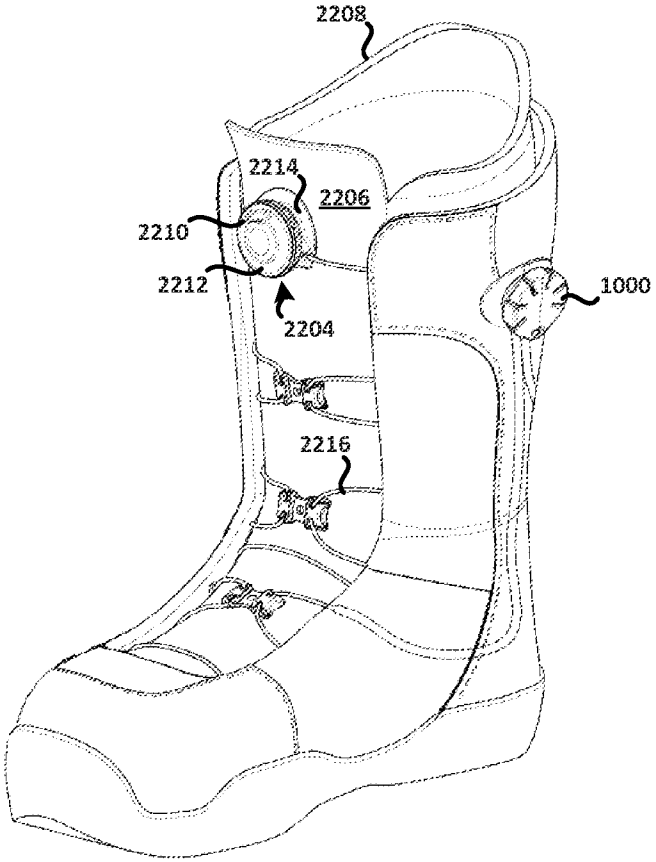
FIG. 22 shows a view of still another lace fixation system.

Referring now to FIG. 22, still another lace fixation system 2202 is shown in accordance with the present disclosure. System 2202 is similar to lace fixation system 2002 of FIG. 20 as described above in many respects. In this example, however, system 2202 exhibits an alternate embodiment of first lace fixation assembly 100. In particular, lace fixation assembly 2204 coupled to first panel 2206 of item 2208 includes reel assembly mechanism 2210 having a knob or dial component 2212 that is rotatable in a first direction (e.g., clockwise) to wind the tension member 2216 about a channel or groove of a spool (not shown) positioned under the knob 2212 and within a housing 2214 of the reel assembly mechanism 2210. The tension member 2216 is laced and/or positioned around one or more guides of an upper portion of item 2208 (i.e., boot). The reel assembly mechanism 2210 is used to tighten the upper portion of item 2208 by tensioning the tension member 2216 via reel assembly mechanism 2210. In some embodiments, the reel assembly mechanism 2210 may be rotated in a second direction (i.e., counter-clockwise) to loosen the tension in tension member 2216 and thereby loosen the upper portion of item 2208. In other embodiments, the knob 2212 may be grasped and moved axially upward to disengage internal components of reel assembly mechanism 2210 and thereby release the tension on tension member 2216. Second assembly 1000 may be used to tension a lower portion of item 2208 as described in the embodiment of FIG. 20. Still other lace fixation assembly embodiments are possible.

Figure 23A:
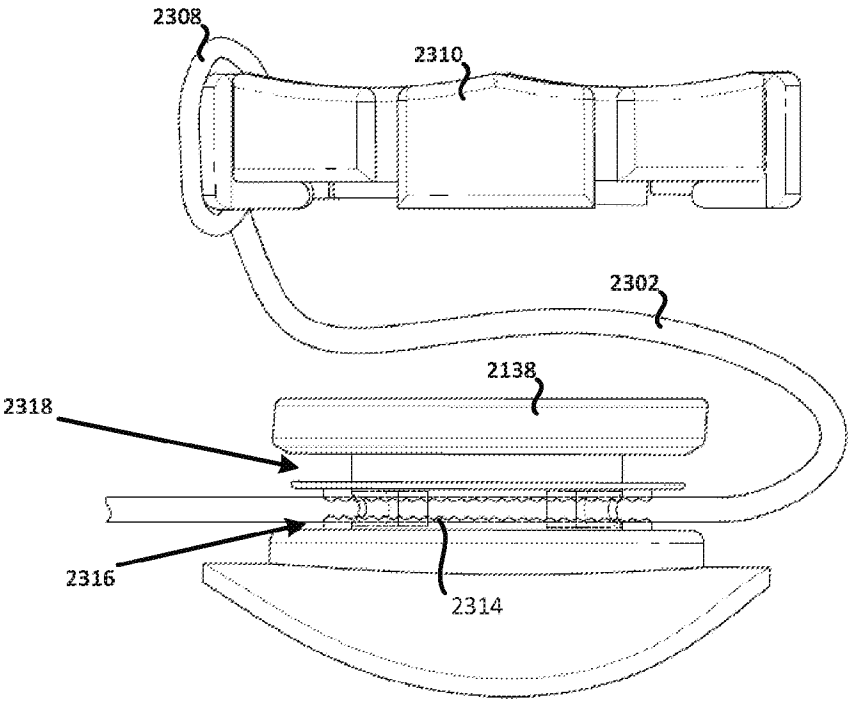
FIGS. 23A-C show various views of a third lace fixation assembly.
Figure 23B:
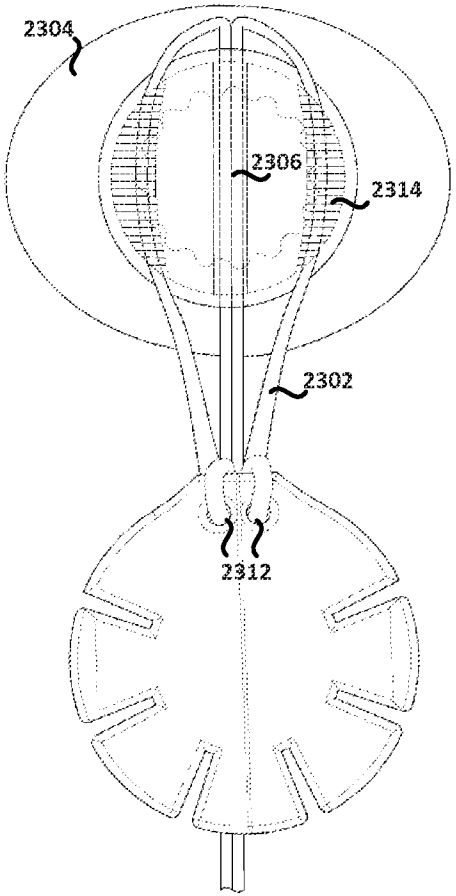
Figure 23C:
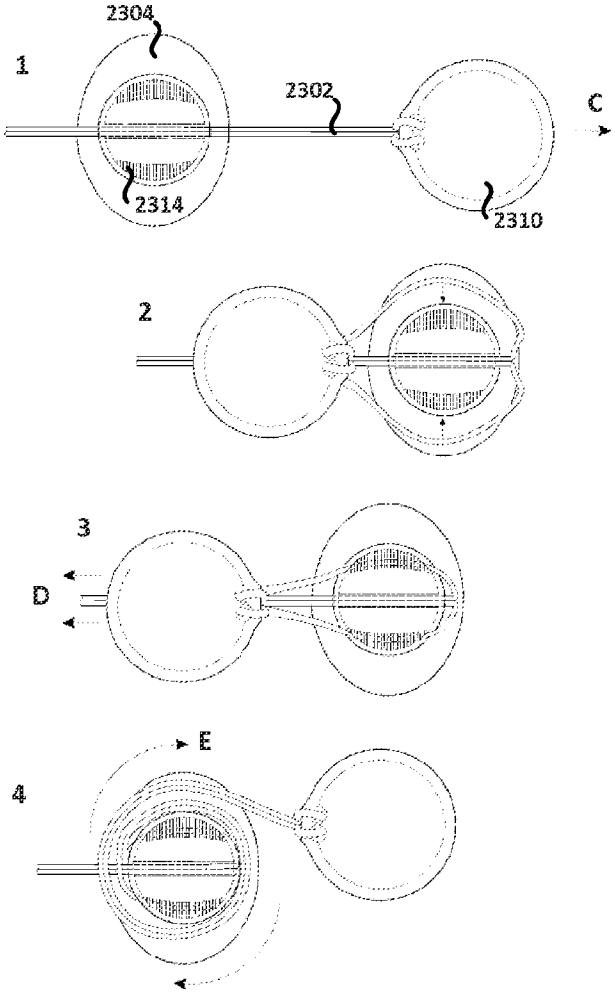

For example, referring now to FIGS. 23A-C, third lace fixation assembly 2300 is shown in accordance with the present disclosure. In the example embodiment, tension member 2302 is laced through plate 2304 of third assembly 2300 via lumen or passage 2306 that guides tension member 2302 through plate 2304, and tensioning end 2308 of tension member 2302 is coupled to tensioning component 2310 at component apertures 2312. As shown in particular by the sequence of FIG. 23C, tensioning component 2310 may initially be pulled in direction C so that tension member 2302 in turn is pulled through passage 2306. Tensioning component 2310 may then be flipped or positioned back over plate 2304 whereby portions of tension member 2302 are engaged with ridged friction surfaces 2314 within channel 2316 of plate 2304. The ridged friction surfaces 2314 engage with tension member 2302 to lock or otherwise maintain the tension member 2302 in a tensioned stated.

FIG. 23A and FIG. 23B too for example illustrates portions of tension member 2302 engaged with ridged friction surfaces 2314 within channel 2316 of plate 2304. Tensioning component 2310 may then be pulled in direction D that is generally opposite direction C so that slack of tension member 2302 is taken up and portions of tension member 2302 are fully engaged with ridged friction surfaces 2314 within channel 2316 to lock or otherwise maintain the tension member 2302 in the tensioned stated. Tensioning component 2310 may then be used to wrap tension member 2302 within second channel 2318 of plate 2304 in rotational direction E and then snap-coupled to flange 2138 of plate 2304 in a manner similar to that described above in connection with tensioning component 1006. Second channel 2318 may be separated from channel 2316 via a flange or other partition member. In the example embodiment, plate 2304 and tensioning component 2310 of at least FIG. 23 are configured in a manner substantially similar to plate 1004 tensioning component 1006 of at least FIG. 10A-D, with at least the exception of ridged friction surfaces 2314. Still other lace fixation assembly embodiments are possible.

Figure 24A:
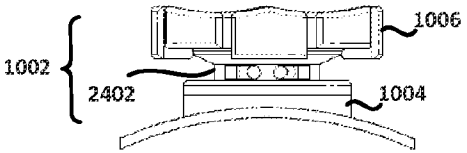
FIGS. 24A-B show various views of a fourth lace fixation assembly.
Figure 24B:
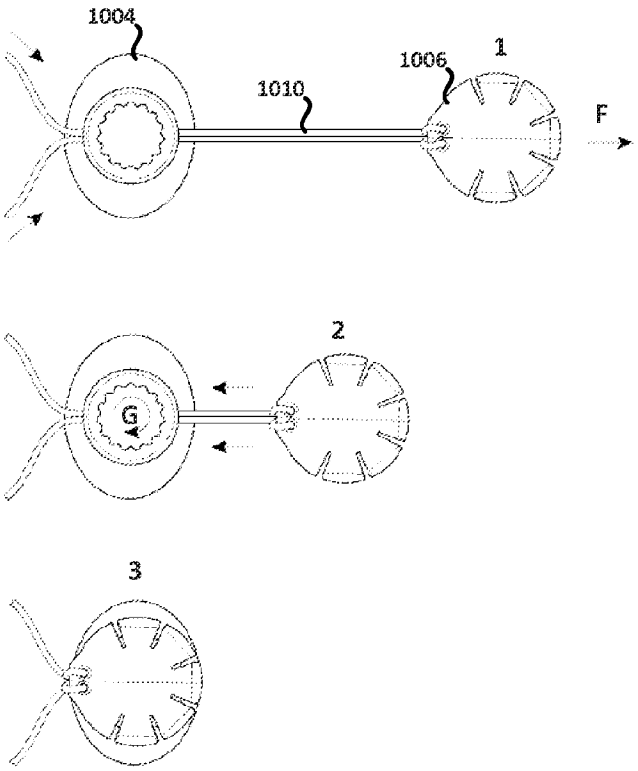

Referring now to FIGS. 24A-B, fourth lace fixation assembly 2400 is shown in accordance with the present disclosure. In the example embodiment, fourth assembly 2400 is substantially similar to second lace fixation assembly 1002 as described above. Fourth assembly 2400 though is configured to exhibit coiler functionality. As shown in particular by the sequence of FIG. 24B, tensioning component 1006 may initially be pulled in direction F so that tension member 1010 in turn is pulled through plate 1004. Post 2402 of plate 1004 may then be rotated in direction G to pull and wind tension member 1010 to groove 1024 formed by plate 1004 (e.g., see FIG. 10). Tensioning component 1006 may then be snap-coupled onto flange 1026 of plate 1004 in manner as described above. In the example embodiment, post 2402 of plate 1004 may be configured and arranged as a rotary dial having a clock spring or spiral-wound torsion spring so that tension member 1010 may be automatically wound to groove 1024 formed by plate 1004 without a user having to use tensioning component 1006 to wrap tension member 1010 to groove 1024 as describe above. In this manner, the user may simply pull tensioning component 1006 in direction F and then release tensioning component 1006 or gently guide tensioning component 1006 as post 2402 automatically rotates in direction G to wind tension member 1010 about groove 1024. In other embodiments, the user may rotate post 2402 in direction G to wind the tension member 1010 about groove 1024. In some embodiments, post 2402 may further be configured and arranged to exhibit push-to-lock/pull-to-unlock functionality whereby when tension member 1010 is fully wrapped to groove 1024 tensioning component 1006 may be pressed to lock second assembly 1002. A reverse operation may be performed to unlock second assembly 1002 so that tension member 1010 may be unwound from groove 1024. Still other lace fixation assembly embodiments are possible.

Figure 25:
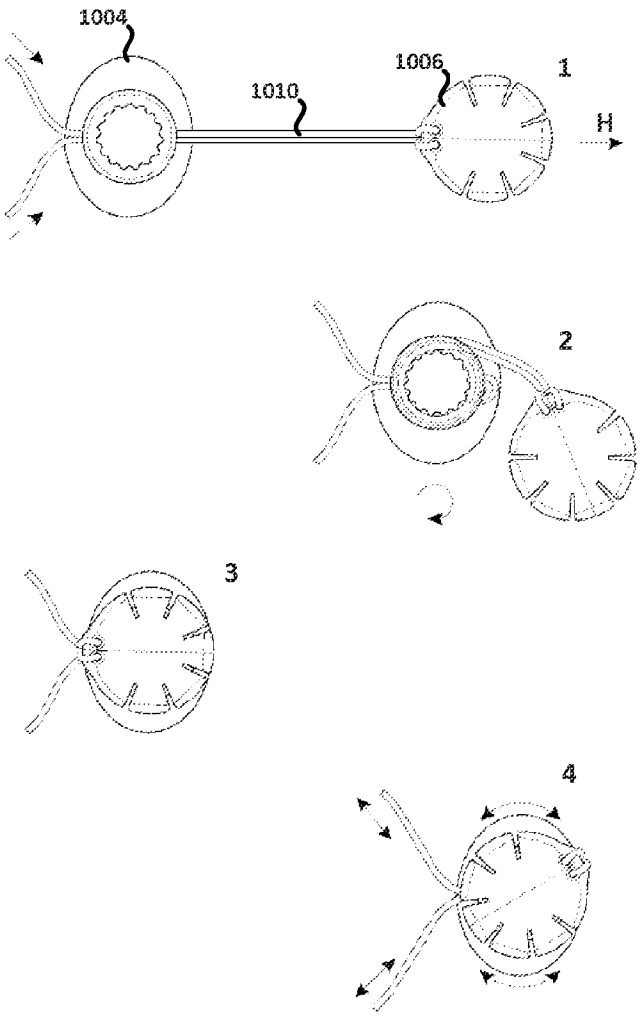
FIG. 25 shows various views of a fifth lace fixation assembly.

Referring now to FIG. 25, fifth lace fixation assembly 2500 is shown in accordance with the present disclosure. In the example embodiment, fifth lace fixation assembly 2500 is substantially similar to second lace fixation assembly 1002 as described above. Fifth assembly 2500 though is configured to exhibit incremental tightening/loosening functionality. For example, as shown in particular by the sequence of FIG. 25, tensioning component 1006 may initially be pulled in direction H so that tension member 1010 in turn is pulled through plate 1004. Tensioning component 1006 may then be used to wrap tension member 1010 to groove 1024 and then snap-coupled onto flange 1026 of plate 1004 in manner as described above. Subsequently, a fine tuning operation may be performed to increase or release tension on tension member 1010. In particular, tensioning component 1006 may be incrementally rotated in a clockwise direction in a fixed ratcheting motion to increase tension on tension member 1010, or incrementally rotated in a counterclockwise direction in the fixed ratcheting motion to release tension on tension member 1010. In the example embodiment, post 2402 of plate 1004 (e.g., see FIG. 24) may be configured and arranged as a ratcheted rotary dial so that tension on tension member 1010 may be increased or decreased as desired, without having to decouple tensioning component 1006 from plate 1004.

Although the various disclosed lace fixation assemblies and systems are described in the context of a closure system for footwear or other panels desired to be closed toward one another, it will be appreciated that the designs may be optimized for a variety of other uses in which a lace or cord is desired to be removably secured at various tension levels or adjustment lengths. Examples include: a) fixation of high tensile rigging aboard ships, allowing for easy adjustment of a given line with secure fixation, b) orthopedic bracing products, c) garment closures, d) equestrian accessories, e) wakeboard boots, f) kitesurfing line adjustments, g) backpack and luggage closures.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth. Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lacing system for tightening an article, comprising:

a fixation member coupled to the article, the fixation member having at least one entry aperture and an exit aperture with a lumen extending therebetween, the fixation member also having a spool with a fixation post;

a tension member having an intermediate portion slidably disposed within the lumen of the fixation member such that a proximal portion of the tension member is positioned on a proximal side of the fixation member and a distal portion of the tension member is positioned on a distal side of the fixation member and such that a length of the proximal portion and a length of the distal portion is adjustable via sliding of the tension member within the lumen;

a plurality of guide members coupled to the article on the proximal side of the fixation member to guide the proximal portion of the tension member along the article to the fixation member; *and* a tensioning [portion of the tension member] *component* to effect sliding of the tension member within the lumen and thereby tighten the article by adjusting the length of the proximal portion of the tension member, and to maintain a tightness of the article by winding of the tension member about the fixation post, wherein the tensioning [portion] *component* is securable to the spool of the fixation member, wherein the plurality of guide members direct the tension member along a panel of the article to the at least one entry aperture, and wherein the tension members overlaps itself along the panel; and wherein the [tensioning portion is a] tensioning component [that] is snap-fit coupleable about the spool.

2. The system of claim 1, wherein the fixation member further includes a flange shaped complementary to the article.

3. The system of claim 1, wherein the lumen extending between the entry aperture and the exit apertures includes an arcuate configuration.

4. The system of claim 1, wherein the tensioning [portion] *component* is ring-shaped.

5. The system of claim 1, wherein the spool and the tensioning component each comprise a plurality of traction members that when engaged inhibit rotation of the tensioning component when the tensioning component is secured about the spool.

6. A lacing system for tightening an article, comprising:

a fixation member coupled to the article, the fixation member having an entry aperture, an exit aperture, and a fixation post that is accessible from an exterior of the fixation member;

a tension member having a proximal portion positioned on a proximal side of the fixation member, a distal portion positioned on a distal side of the fixation member, and an intermediate portion slidably disposed within the fixation member, wherein a length of the proximal portion and a length of the distal portion is adjustable via sliding of the tension member within the fixation member;

a plurality of guide members coupled to the article on the proximal side of the fixation member to guide the proximal portion of the tension member along the article; *and* a tensioning [portion of the tension member] *component* that effects sliding of the tension member within the fixation member and thereby tightens the article by adjusting the length of the proximal portion of the tension member, and that maintains a tightness of the article by winding of the tension member about the fixation post from the exterior of the fixation member; and wherein the tensioning [portion comprises a] component [that] is snap-fit coupleable about the fixation member.

7. The system of claim 6, wherein the tensioning [portion] *component* is securable to the fixation member.

8. The system of claim 6, wherein the tensioning [portion is a] component [that] is coupled to the distal portion of the tension member.

9. A lacing system for tightening an article, comprising:

a fixation member coupled to the article, the fixation member having at least one entry aperture and an exit aperture with a lumen extending therebetween, the fixation member also having a spool with a fixation post, the fixation post being accessible from an exterior of the fixation member;

a tension member having an intermediate portion slidably disposed within the lumen of the fixation member such that a proximal portion of the tension member is positioned on a proximal side of the fixation member and a distal portion of the tension member is positioned on a distal side of the fixation member and such that a length of the proximal portion and a length of the distal portion is adjustable via sliding of the tension member within the lumen;

a plurality of guide members coupled to the article on the proximal side of the fixation member to guide the proximal portion of the tension member along the article to the fixation member; *and* a tensioning [portion of the tension member] *component* to effect sliding of the tension member within the lumen and thereby tighten the article by adjusting the length of the proximal portion of the tension member, and to maintain a tightness of the article by winding of the tension member about the fixation post from the exterior of the fixation member, wherein the tensioning [portion] *component* is securable to the spool of the fixation member; and wherein the [tensioning portion is a] tensioning component [that] is snap-fit coupleable about the spool.

10. The system of claim 9, wherein the fixation member further includes a flange shaped complementary to the article.

11. The system of claim 9, wherein the lumen extending between the entry aperture and the exit apertures includes an arcuate configuration.

12. The system of claim 9, wherein the plurality of guide members direct the tension member along a panel of the article without overlap to the at least one entry aperture.

13. The system of claim 9, wherein the plurality of guide members direct the tension member along a panel of the article to the at least one entry aperture, and wherein the tension members overlaps itself along the panel.

14. The system of claim 9, wherein the tensioning [portion] *component* is ring-shaped.

15. The system of claim 9, wherein the spool and the tensioning component each comprise a plurality of traction members that when engaged inhibit rotation of the tensioning component when the tensioning component is secured about the spool.

* * * * *